United States Patent
Im et al.

(10) Patent No.: US 11,725,329 B2
(45) Date of Patent: Aug. 15, 2023

(54) ARTIFICIAL INTELLIGENCE LAUNDRY TREATMENT APPARATUS AND METHOD OF CONTROLLING THE SAME

(71) Applicant: LG Electronics Inc., Seoul (KR)

(72) Inventors: Myunghun Im, Seoul (KR); Hwanjin Jung, Seoul (KR); Seonhwa Yu, Seoul (KR); Sunggyun Kim, Seoul (KR); Kyungchul Woo, Seoul (KR); Jaehyun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 244 days.

(21) Appl. No.: 16/557,398

(22) Filed: Aug. 30, 2019

(65) Prior Publication Data
US 2020/0102685 A1 Apr. 2, 2020

(30) Foreign Application Priority Data

Aug. 30, 2018 (KR) .................. 10-2018-0103075

(51) Int. Cl.
*D06F 34/18* (2020.01)
*D06F 37/30* (2020.01)
*D06F 21/10* (2006.01)

(52) U.S. Cl.
CPC .......... *D06F 37/304* (2013.01); *D06F 21/10* (2013.01); *D06F 34/18* (2020.02)

(58) Field of Classification Search
CPC .......... D06F 18/00; D06F 25/00; D06F 33/00; D06F 34/08; D06F 34/10; D06F 34/18;
(Continued)

(56) References Cited

U.S. PATENT DOCUMENTS

2003/0041390 A1* 3/2003 Kim .................. D06F 34/18
8/158
2011/0202303 A1 8/2011 Petronilho et al.
(Continued)

FOREIGN PATENT DOCUMENTS

CN 102449225 5/2012
CN 103628275 3/2014
(Continued)

OTHER PUBLICATIONS

ET Land Hwamyeong, "AddWash Samsung Smart of the drum smartthings WF19N8750KW," Naver blog, dated Mar. 24, 2018, 6 pages.
(Continued)

*Primary Examiner* — David G Cormier
(74) *Attorney, Agent, or Firm* — Fish & Richardson P.C.

(57) ABSTRACT

Disclosed is an artificial intelligence laundry treatment apparatus including a washing tub configured to receive laundry, the washing tub being configured to be rotatable, a motor configured to rotate the washing tub, a controller configured to control the motor such that the washing tub is rotated while being accelerated, and a current sensing unit configured to sense current of the motor, wherein the controller is configured to obtain laundry weight and laundry quality from output of an output layer of an artificial neural network pre-trained based on machine learning using a current value sensed by the current sensing unit during accelerated rotation of the washing tub as input of an input layer of the artificial neural network within a range within which the laundry moves in the washing tub.

8 Claims, 17 Drawing Sheets

(58) Field of Classification Search
CPC ............ D06F 35/00–008; D06F 37/00; D06F 37/203; D06F 37/22; D06F 37/225; D06F 37/24; D06F 37/245; D06F 37/304; D06F 39/00; D06F 39/006; D06F 58/00–04; D06F 58/08; D06F 58/20; D06F 58/203; D06F 58/30; D06F 58/38; D06F 58/50; D06F 2103/00–08; D06F 2103/24; D06F 2103/46; D06F 2105/46; D06F 2105/48; D06F 2202/00; D06F 2202/06; D06F 2202/065; D06F 2202/10; D06F 2202/12; D06F 2204/00; D06F 2204/06; D06F 2204/065; D06F 2222/00
See application file for complete search history.

(56) References Cited

U.S. PATENT DOCUMENTS

| | | | |
|---|---|---|---|
| 2015/0047128 A1* | 2/2015 | Goshgarian | D06F 34/18 8/137 |
| 2018/0087209 A1* | 3/2018 | Lee | D06F 34/18 |

FOREIGN PATENT DOCUMENTS

| | | |
|---|---|---|
| CN | 106757976 | 5/2017 |
| GB | 2253496 | 9/1992 |
| JP | H02154793 | 6/1990 |
| JP | H04325194 | 11/1992 |
| JP | H05277276 | 10/1993 |
| KR | 1020110036028 | 4/2011 |
| KR | 1020150019647 | 2/2015 |
| KR | 101841248 | 3/2018 |
| KR | 20180038727 | 4/2018 |

OTHER PUBLICATIONS

Extended European Search Report in European Application No. 19194525.2, dated Feb. 14, 2020, 6 pages.
CN Office Action in Chinese Appln. No. 201910814965.7, dated May 8, 2021, 14 pages (with English translation).
Office Action in Korean Appln. No. 10-2018-0103075, dated Oct. 17, 2022, 19 pages (with English translation).

* cited by examiner

ARTIFICIAL INTELLIGENCE LAUNDRY TREATMENT APPARATUS AND METHOD OF CONTROLLING THE SAME

CROSS-REFERENCE TO RELATED APPLICATION

This application claims the benefit of priority to Korean Application No. 10-2018-0103075, filed on Aug. 30, 2018, the contents of which is hereby incorporated by reference in its entirety.

BACKGROUND OF THE INVENTION

Field of the Invention

The present invention relates to a laundry treatment apparatus that senses laundry weight and laundry quality based on machine learning and a method of controlling the same.

Description of the Related Art

A laundry treatment apparatus is an apparatus that treats laundry through various operations, such as washing, rinsing, spin drying, and/or drying. The laundry treatment apparatus has a washing tub, which is rotated by a motor.

The laundry treatment apparatus is generally equipped with an algorithm for sensing the weight of laundry (or laundry weight) introduced into the washing tub. For example, Conventional art 1 (Korean Patent Application Publication No. 10-2006-0061319) discloses a method of calculating information, such as an eccentric value, DC voltage, and a motor torque value, obtained while performing control such that a motor is rotated at a uniform speed after the motor is accelerated to a predetermined rate of rotation using the following mathematical expressions in order to sense laundry weight.

Laundry weight value=average of current amount in constant speed period+DC voltage compensation value−eccentric compensation value+$a$ ($a$ being a constant acquired through experimentation)

DC voltage compensation value=(DC voltage sensing value−$b$)×$t$ ($b$ being an experimental constant and $t$ being time during a constant speed period)

Eccentric compensation value=eccentric value in constant speed period×$d$ ($d$ being an experimental constant)

In Conventional art 1, many constants are used to estimate the laundry weight value, and most thereof are experimental values, whereby expert settings are required, and setting values are not accurate. Consequently, Conventional art 1 has a limitation in improving accuracy in sensing the laundry weight.

Also, in Conventional art 1, setting values (experimental constants) must be accurately found in order to improve accuracy in sensing the laundry weight, which may require lots of time.

Conventional art 2 (Korean Patent Application Publication No. 1999-0065538) discloses a method of measuring time necessary to accelerate a motor to a predetermined speed and variation in the rotational speed of the motor while the motor is rotated at the predetermined speed in order to sense laundry weight.

In Conventional art 2, the measured time and variation in the rotational speed of the motor are compared with a predetermined laundry weight sensing comparison value in order to sense whether the laundry weight is large or small. The values are simply compared with each other in terms of size in order to sense the laundry weight. That is, it is only possible to distinguish between large laundry weight and small laundry weight. Consequently, Conventional art 2 has a limitation in accurately sensing various kinds of laundry weight. In addition, even in Conventional art 2, a person must find all setting values in advance for comparison, which is troublesome.

In the case in which laundry weight is not accurately measured, lots of time is necessary to perform a spin-drying operation, which is performed at a high speed. As a result, a total washing time is increased, whereby energy consumption is increased. For these reasons, various research on a method of accurately sensing laundry weight has been conducted.

Meanwhile, in recent years, interest in artificial intelligence and machine learning, such as deep learning, has increased. Classification, regression, and clustering models based on statistics are located in the center of conventional machine learning. Particularly, in supervised learning of the classification and regression models, a person defines, in advance, characteristics of learning data and a learning model that distinguishes between new data based on the characteristics. Unlike this, deep learning is a computer finding and distinguishing between characteristics by itself.

One of the factors that accelerate the growth of deep learning is an open source deep learning framework. For example, examples of the deep learning framework include Theano from Montreal University in Canada, Torch from New York University in USA, Caffe from University of California, Berkeley in USA, and TensorFlow from Google.

As the deep learning framework is open, a learning process, a learning method, and extraction and selection of data used for learning become further important for effective learning and recognition in addition to a deep learning algorithm. In addition, research on the use of artificial intelligence and machine learning in various kinds of products and services has been increasingly conducted.

PRIOR ART DOCUMENTS

Patent Documents

1. Korean Patent Application Publication No. 10-2006-0061319 (published on Jun. 7, 2006)
2. Korean Patent Application Publication No. 1999-0065538 (published on Aug. 5, 1999)

SUMMARY OF THE INVENTION

It is an object of the present invention to provide a laundry treatment apparatus capable of rapidly and accurately sensing laundry weight and/or laundry quality based on machine learning and a method of controlling the same.

It is another object of the present invention to provide a laundry treatment apparatus capable of efficiently processing data used to determine laundry weight and/or laundry quality in order to reduce time necessary for determination and a method of controlling the same.

It is another object of the present invention to provide a laundry treatment apparatus capable of classifying laundry based on various criteria, such as the softness/hardness of the laundry, the water content of the laundry, and the volumetric difference between dry laundry and wet laundry, and a method of controlling the same.

It is a further object of the present invention to provide a laundry treatment apparatus capable of improving accuracy in classifying laundry with accumulation of training data (motor current data) of machine learning and a method of controlling the same.

In accordance with an aspect of the present invention, the above and other objects can be accomplished by the provision of a laundry treatment apparatus configured such that a washing tub is rotated while being accelerated within a range within which laundry moves in the washing tub and such that current supplied to a motor is sensed by a current sensing unit in this process.

The current value thus obtained may be input to an input layer of an artificial neural network pre-trained based on machine learning, and laundry weight and laundry quality may be output from an output layer of the artificial neural network.

When the washing tub is rotated one or more revolutions in one direction in a rotational speed period of the washing tub in which the current value as the input data of the artificial neural network is obtained, laundry located at the lowermost side in the washing tub may be raised to a predetermined height by rotation of the washing tub and may then be dropped while being separated from the washing tub.

The controller may be configured to select a current value corresponding to a period in which the rotational speed of the motor is accelerated from a first rotational speed to a second rotational speed from among current values obtained by the current sensing unit based on a speed value sensed by a speed sensing unit and to use the selected current value as the input data. The second rotational speed may be 60 to 80 rpm.

The controller may be configured to perform control such that the motor is rotated while maintaining the second rotational speed after the rotational speed of the motor reaches the second rotational speed. When the washing tub is rotated one or more revolutions in one direction by rotation of the motor at the second rotational speed, the laundry in the washing tub may be rotated in the state of clinging to the washing tub without being dropped from the highest point of the washing tub. The first rotational speed may be 10 to 20 rpm.

The laundry quality may be classified in consideration of wear degree and washing strength of the laundry.

The controller may be configured to perform control such that water is supplied into the washing tub and then the washing tub is accelerated. The controller may be configured to construct operation settings based on the laundry weight and the laundry quality and to control the operation of the laundry treatment apparatus according to the constructed operation settings.

The laundry weight and the laundry quality may be determined repeatedly a plurality of times.

In accordance with another aspect of the present invention, there is provided a method of controlling a laundry treatment apparatus, the method including accelerating a washing tub having laundry introduced thereinto, obtaining a current value of a motor configured to rotate the washing tub in a period in which the washing tub is rotated while being accelerated within a range within which the laundry moves in the washing tub, and obtaining laundry weight and laundry quality from output of an output layer of an artificial neural network pre-trained based on machine learning using the current value as input of an input layer of the artificial neural network.

The method may further include sensing the rotational speed of the motor, wherein a current value corresponding to a period in which the rotational speed of the motor is accelerated from a first rotational speed to a second rotational speed may be selected from among obtained current values based on the sensed speed value, and the selected current value may be used as the input data.

When the washing tub is rotated one or more revolutions in one direction in a rotational speed period of the washing tub in which the current value as the input data is obtained, laundry located at the lowermost side in the washing tub may be raised to a predetermined height by rotation of the washing tub and may then be dropped while being separated from the washing tub.

The method may further include performing control such that the motor is rotated while maintaining the second rotational speed after the rotational speed of the motor reaches the second rotational speed, wherein, when the washing tub is rotated one or more revolutions in one direction by rotation of the motor at the second rotational speed, the laundry in the washing tub may be rotated in the state of clinging to the washing tub without being dropped from the highest point of the washing tub.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Hereinafter, embodiments of the present invention will be described with reference to the accompanying drawings. However, the present invention is not limited to the following embodiments and may be implemented in various different forms.

Parts that are not related to the description of the present invention will be omitted from the drawings in order to clearly and briefly describe the present invention. Wherever possible, the same reference numbers will be used throughout the specification to refer to the same or like elements.

Meanwhile, the terms "module" and "unit," when attached to the names of components, are used herein merely for convenience of description, and thus they should not be considered as having specific meanings or roles. Accordingly, the terms "module" and "unit" may be used interchangeably.

Figure 1:
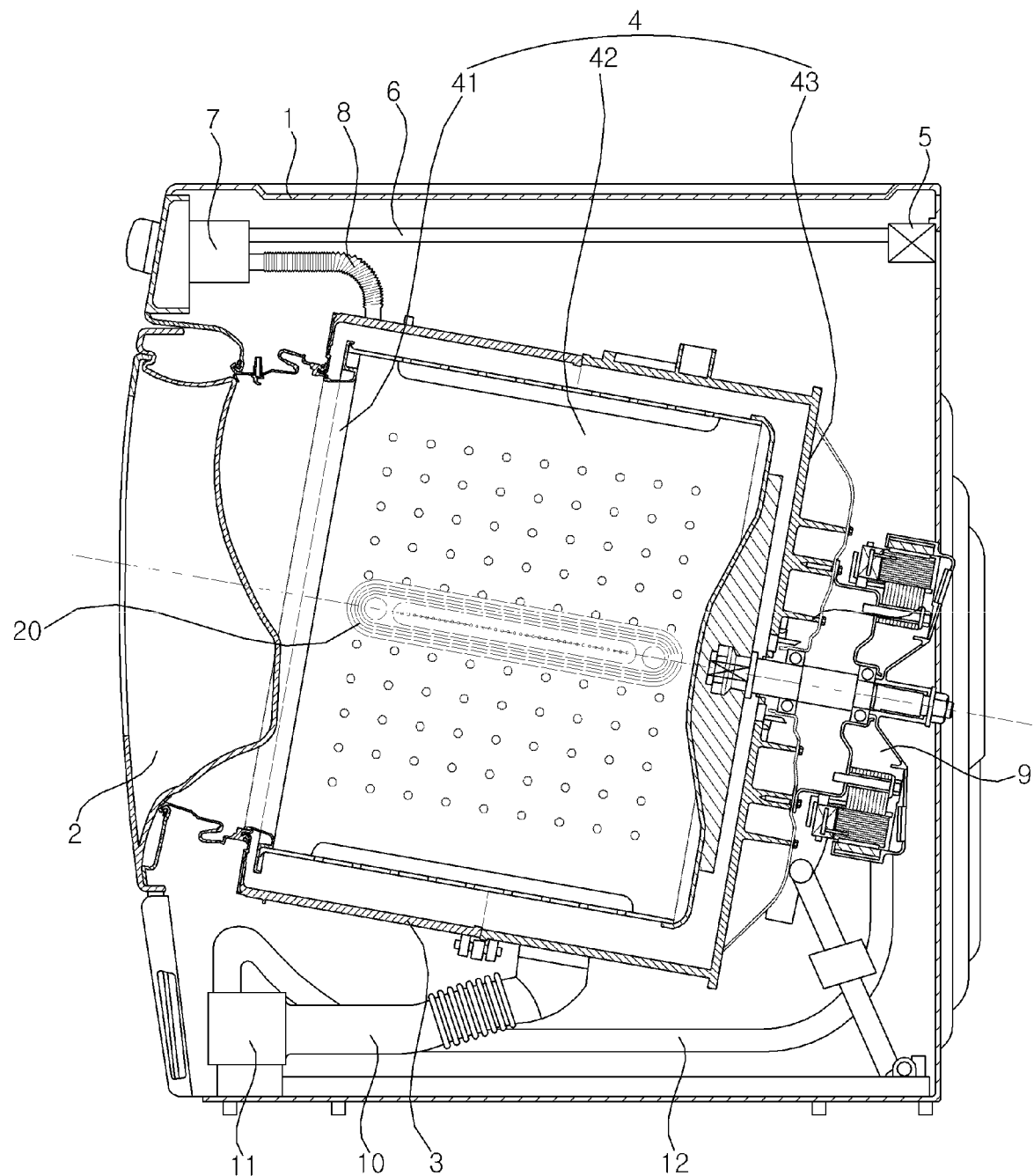
FIG. 1 is a side sectional view showing a laundry treatment apparatus according to an embodiment of the present invention.
Figure 2:
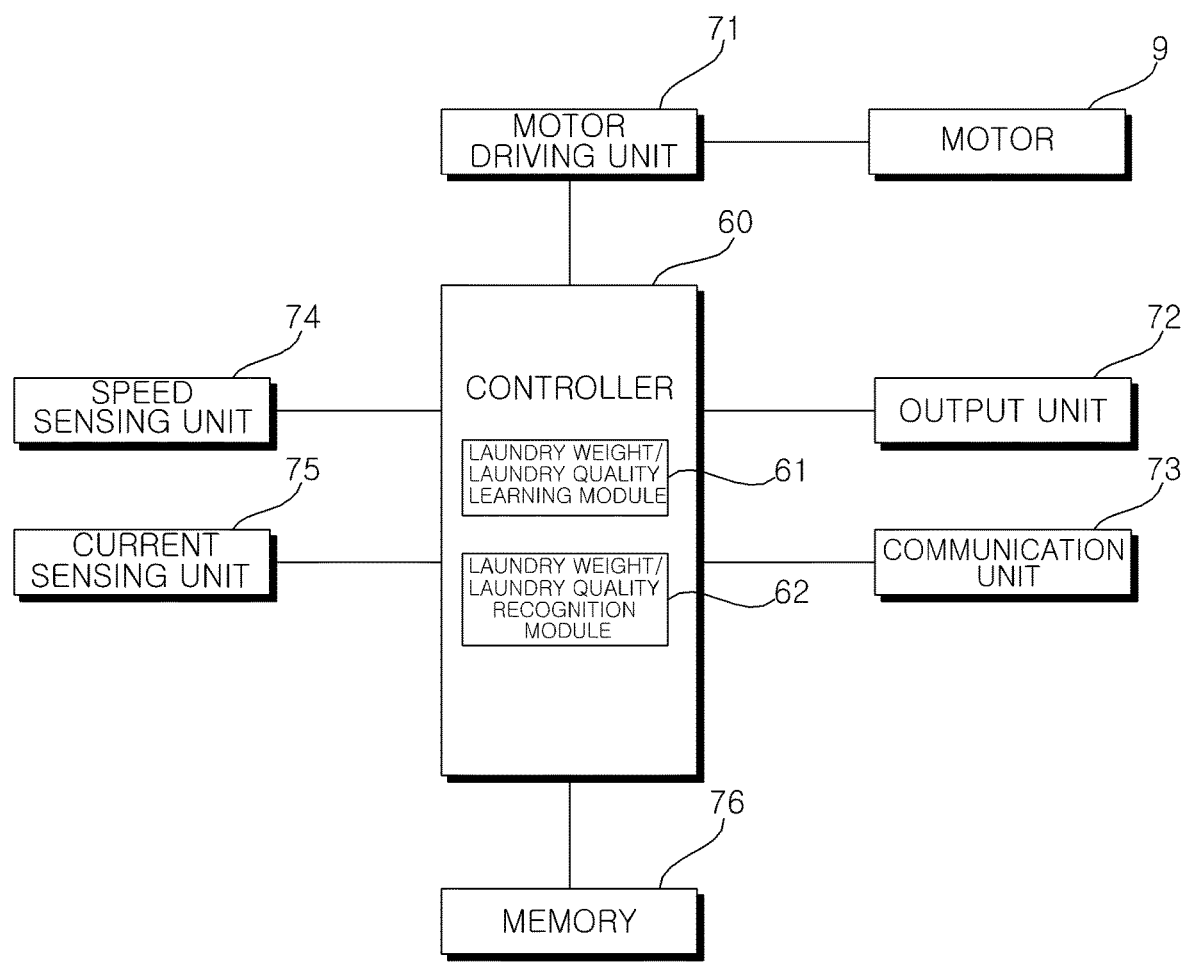
FIG. 2 is a block diagram showing a control relationship between main components of the laundry treatment apparatus of FIG. 1.

FIG. 1 is a sectional view showing a laundry treatment apparatus according to an embodiment of the present invention. FIG. 2 is a block diagram showing a control relationship between main components of the laundry treatment apparatus according to the embodiment of the present invention.

Referring to FIG. 1, the laundry treatment apparatus according to the embodiment of the present invention includes a casing 1, which defines the external appearance thereof, a water storage tub 3 disposed in the casing 1 for storing wash water, a washing tub 4 rotatably installed in the water storage tub 3, laundry being introduced into the washing tub 4, and a motor 9 for rotating the washing tub 4.

The washing tub 4 includes a front cover 41 having therein an opening through which laundry is introduced and removed, a cylindrical drum 42 disposed approximately horizontally, the front end of the cylindrical drum 42 being coupled to the front cover 41, and a rear cover 43 coupled to the rear end of the drum 42. A rotary shaft of the motor 9 may be connected to the rear cover 43 through a rear wall of the water storage tub 3. A plurality of through-holes may be formed in the drum 42 such that water flows between the washing tub 4 and the water storage tub 3.

A lifter 20 may be provided at the inner circumferential surface of the drum 42. The lifter 20 may be formed so as to protrude from the inner circumferential surface of the drum 42, and may extend in the longitudinal direction (the forward-rearward direction) of the drum 42. A plurality of lifters 20 may be arranged in the circumferential direction of the drum 42 so as to be spaced apart from each other. When the washing tub 4 is rotated, laundry may be lifted up by the lifters 20.

The washing tub 4 is rotated about a horizontal axis. Here, "horizontality" does not mean geometric horizontality in the strict sense of the word. Even in the case in which the washing tub 4 is inclined at a predetermined angle to the horizontality, as shown in FIG. 1, the inclination of the washing tub 4 is approximate to the horizontality, rather than the verticality. Hereinafter, therefore, the washing tub 4 will be described as being rotated about the horizontal axis.

A laundry introduction port is formed in the front surface of the casing 1, and a door 2 for opening and closing the laundry introduction port is hinged to the casing 1. A water supply valve 5, a water supply pipe 6, and a water supply hose 8 may be installed in the casing 1. When the water supply valve 5 is opened in order to supply water, wash water passing through the water supply pipe 6 is mixed with detergent in a dispenser 7, and is then supplied to the water storage tub 3 through the water supply hose 8.

An input port of a pump 11 is connected to the water storage tub 3 via a discharge hose 10, and a discharge port of the pump 11 is connected to a drainage pipe 12. Water discharged from the water storage tub 3 through the discharge hose 10 is driven along the drainage pipe 12 by the pump 11, and is then discharged out of the laundry treatment apparatus.

Referring to FIG. 2, the laundry treatment apparatus according to the embodiment of the present invention may include a controller 60 for controlling the overall operation of the laundry treatment apparatus, a motor driving unit 71, an output unit 72, a communication unit 73, a speed sensing unit 74, a current sensing unit 75, and a memory 76, all of which are controlled by the controller 60.

The controller 60 may control a series of washing processes, such as washing, rinsing, spin drying, and drying. The controller 60 may perform washing and rinsing cycles according to a predetermined algorithm. In addition, the controller 60 may control the motor driving unit 71 according to the algorithm.

The motor driving unit 71 may control driving of the motor 9 in response to a control signal from the control unit 60. The control signal may be a signal for controlling the target speed, the acceleration gradient (or acceleration), the driving time, etc. of the motor 9.

The motor driving unit 71, which drives the motor 9, may include an inverter (not shown) and an inverter controller (not shown). In addition, the motor driving unit 71 may be a concept further including a converter for supplying direct-current power that is input to the inverter.

For example, in the case in which the inverter controller (not shown) outputs a pulse with modulation (PWM) type switching control signal to the inverter (not shown), the inverter (not shown) may perform a high-speed switching operation in order to supply alternating-current power having a predetermined frequency to the motor 9.

The speed sensing unit 74 senses the rotational speed of the washing tub 4. The speed sensing unit 74 may sense the rotational speed of a rotor of the motor 9. In the case in which planetary gear trains, which convert the rotation ratio of the motor 9 in order to rotate the washing tub 4, are provided, the rotational speed of the washing tub 4 may be a value obtained by converting the rotational speed of the rotor sensed by the speed sensing unit 74 in consideration of the deceleration or acceleration ratio of the planetary gear trains.

The controller 60 may control the motor driving unit 71 such that the motor follows the predetermined target speed using the present speed transmitted from the speed sensing unit 74 as feedback.

The current sensing unit 75 may sense current that is supplied to the motor (hereinafter referred to as present current), and may transmit the sensed present current to the controller 60. The controller 60 may sense laundry weight and laundry quality using the received present current as input data. At this time, present current values as the input data include values obtained while the motor 9 is accelerated to the predetermined target speed.

In the case in which the rotation of the motor 9 is controlled through vector control based on torque current and flux current, the present current may be a torque-axis (q-axis) component of current flowing in a motor circuit, i.e. torque current Iq.

The output unit 72 outputs the operation state of the laundry treatment apparatus. The output unit 72 may be an image output device that visually outputs images, such as an LCD or an LED, or a sound output device that outputs sound, such as a speaker or a buzzer. The output unit 72 may output information about the laundry weight or the laundry quality under the control of the controller 60.

The memory 76 may store a programmed artificial neural network, patterns of current by laundry weight and/or by laundry quality, a database (DB) constructed through machine-learning-based training based on the patterns of current, a machine learning algorithm, present current values sensed by the current sensing unit 75, an average of the present current values, a value obtained by processing the average according to a parsing rule, and data transmitted and received through the communication unit 73.

In addition, the memory 76 may store various control data for controlling the overall operation of the laundry treatment apparatus, washing setting data input by a user, washing time obtained according to washing setting, data about a washing course, and data for determining whether an error occurs in the laundry treatment apparatus.

The communication unit 73 may communicate with a server connected to a network. The communication unit 73 may include one or more communication modules, such as an Internet module and a mobile communication module. The communication unit 73 may receive various data, such as learning data and algorithm update, from the server.

The controller 60 may process various data received through the communication unit 73 in order to update the memory 76. For example, in the case in which data input through the communication unit 73 are update data about an operation program stored in the memory 76 in advance, the controller 60 may update the memory 76 using the same. In the case in which the input data are a new operation program, the controller 60 may also store the same in the memory 76.

Machine learning means that, although a human does not directly instruct logic to a computer, the computer learns through data and thus solves problems for itself therethrough.

Deep learning is a method of teaching a human's way of thinking to a computer based on an artificial neural network (ANN) for constructing artificial intelligence, and is artificial intelligence technology enabling the computer to autonomously learn like a human although the human does not teach the computer. The artificial neural network (ANN) may be realized in the form of software or hardware, such as a chip.

The laundry treatment apparatus may process current values sensed by the current sensing unit 75 in order to grasp the features of laundry introduced into the washing tub 4 (hereinafter referred to as laundry characteristics) based on machine learning. Examples of the laundry characteristics may include laundry weight and laundry quality. The controller 60 may determine laundry quality by laundry weight based on machine learning. For example, the controller 60 may obtain laundry weight, and may determine one of previously classified categories to which laundry belongs based on laundry quality. The laundry quality may be defined based on various factors, such as the material of laundry, the softness of laundry (e.g. soft laundry/hard laundry), the ability of laundry to contain water (i.e. water content), and the volumetric difference between dry laundry and wet laundry.

The controller 60 may sense laundry weight using the present current value sensed by the current sensing unit 75 until the target speed is reached as input data of the artificial neural network previously trained through machine learning.

Figure 3:
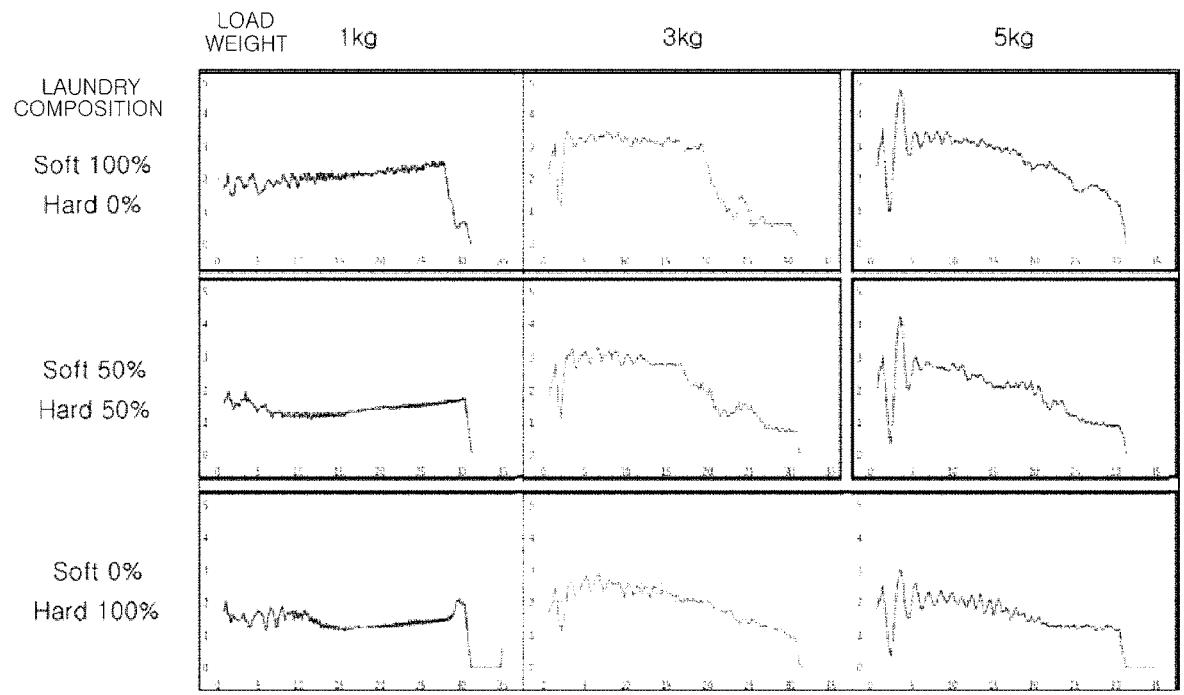
FIG. 3 is a view showing the pattern of current supplied to a motor based on laundry quality and load weight (laundry weight)
Figure 4:
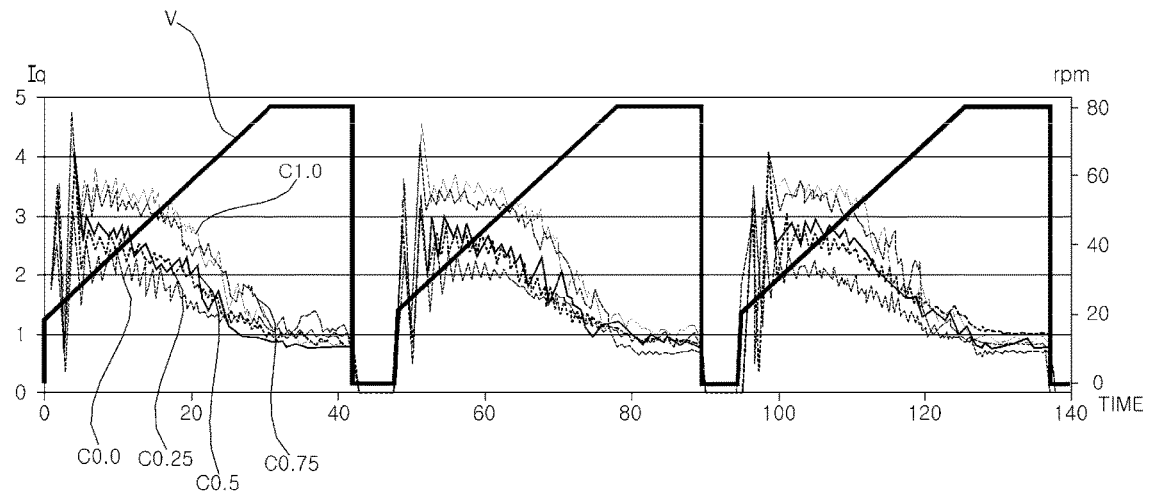
FIG. 4 is a view showing the pattern of current by laundry quality.
Figure 5:
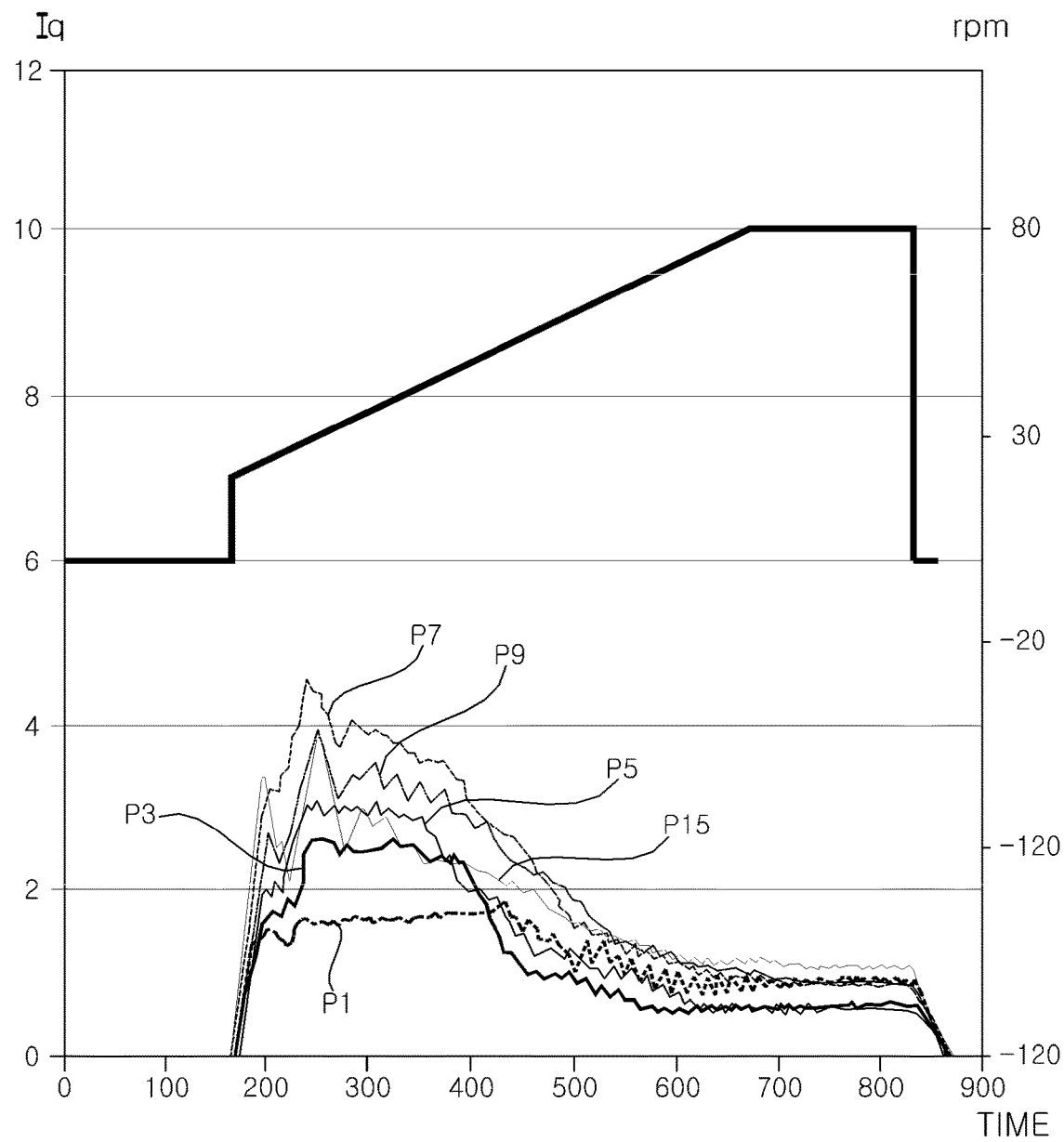
FIG. 5 is a view showing the pattern of current by load in the state in which the speed of a motor is controlled using a predetermined method.

FIG. 3 is a view showing the pattern of current supplied to the motor based on laundry quality and load weight (laundry weight). FIG. 4 is a view showing the pattern of current by laundry quality. FIG. 5 is a view showing the pattern of current by load in the state in which the speed of the motor is controlled using a predetermined method.

Graphs shown in FIG. 3 show present current measured while the washing tub 4 is accelerated to a predetermined target speed (e.g. 80 rpm). In these graphs, measurement was performed while the composition of laundry (i.e. the mixing ratio of soft laundry to hard laundry) and load weight were changed. That is, it is possible to grasp a change in the pattern depending on load weight from the graphs arranged horizontally. For example, in the case of the same composition of laundry, it can be seen that the maximum value of present current in the initial stage of acceleration of the washing tub 4 increases as load weight is increased. Consequently, it may be appropriate to use the initial data of the graphs in order to determine load weight (laundry weight).

It is possible to grasp a change in the pattern depending on the composition of laundry from the graphs arranged vertically. For example, in the case of the same load weight, it can be seen that the current value decreases as the percentage of hard laundry is increased and that this phenomenon is particularly prominent in the intermediate and last stage of acceleration of the washing tub 4, in the intermediate/last stage of rotation of the washing tub 4, or in a period in which the target speed is maintained. Consequently, it may be appropriate to adopt data necessary to obtain laundry quality after the period in which the data to be used to determine laundry weight are obtained.

FIG. 4 shows the pattern of present current by laundry composition (laundry quality). In FIG. 4, C0.0 indicates 100% of soft laundry, C0.25, C0.5, and C0.75 indicate that the ratio of soft laundry to hard laundry is 1:3, 1:1, and 3:1, respectively, and C1.0 indicates 100% of hard laundry. In each case, the total laundry weight (load weight) including both soft laundry and hard laundry is uniform.

The graphs show that, in the case in which laundry composition is changed, the pattern of present current is changed even though load weight is uniform. Consequently, classification according to laundry composition (or laundry weight) is possible based on machine learning of current pattern.

Sensing of laundry weight/laundry quality may be repeated a plurality of times. In this embodiment, sensing of laundry weight/laundry quality is repeated three times.

The controller 60 may set a washing algorithm, or may change the setting of the washing algorithm, according to each result of sensing of laundry weight/laundry quality, and may control the operation of the laundry treatment apparatus according to the set washing algorithm.

Graphs P1, P3, P5, P7, P9, and P15 shown in FIG. 5 indicate that laundry weight is 1, 3, 5, 7, 9, and 15 kg, respectively. Each of the graphs is generally formed such that the present current value is abruptly increased to a predetermined level in the initial stage of acceleration of the washing tub 4 and converges on a uniform value in the last stage of rotation of the washing tub 4. In particular, it can be seen that deviation in the present current value depending on laundry weight is prominent in the initial stage of acceleration of the washing tub 4.

The controller 60 may include a laundry weight/laundry quality learning module 61 and a laundry weight/laundry quality recognition module 62. The laundry weight/laundry quality learning module 61 may perform machine learning using the present current value sensed by the current sensing unit 75 or a value obtained by processing the present current value. The laundry weight/laundry quality learning module 61 may update the database stored in the memory 76 through machine learning.

Any one of unsupervised learning and supervised learning may be used as a learning method of the laundry weight/laundry quality learning module 61.

The laundry weight/laundry quality recognition module 62 may determine a level depending on laundry weight based on data trained by the laundry weight/laundry quality learning module 61. Determination of laundry weight may be work of classifying laundry introduced into the washing tub 4 into a predetermined plurality of laundry weight levels depending on weight (load).

In this embodiment, laundry weight is classified into five steps (levels). Load weight (kg) corresponding to each level is shown in Table 1 below. In addition, Table 1 statistically shows the number of members constituting a family in the case in which laundry having corresponding laundry weight is introduced into the laundry treatment apparatus for the family.

TABLE 1

| Laundry weight (5 steps) | Load weight | Number of family members |
|---|---|---|
| Level 1 | 0 to 1 kg | 1 |
| Level 2 | 1 to 3 kg | 1 or 2 |
| Level 3 | 3 to 5 kg | 3 |
| Level 4 | 5 to 6 kg | 3 or more |
| Level 5 | 6 kg or more | |

Determination of laundry quality serves to classify laundry introduced into the washing tub 4 based on predetermined criteria. The criteria may include the material of laundry, the softness or hardness of laundry, the water content of laundry, and the volumetric difference between dry laundry and wet laundry.

The laundry weight/laundry quality recognition module 62 may determine one of the laundry weight levels to which laundry introduced into the washing tub 4 corresponds and one of the laundry quality steps to which the laundry corresponds (i.e. laundry quality by laundry weight) based on the present current value obtained from the current sensing unit 75.

| Laundry quality (5 steps) | Wear degree/Washing strength | Kind |
|---|---|---|
| Level 1 | Wear degree: high Washing strength: low | Clothes made of light and soft materials and underwear made of delicate materials (e.g. silk) |
| Level 2 | Mixture of level 1 laundry and level 3 laundry | |
| Level 3 | Wear degree: middle Washing strength: middle | Cotton-spun outer garments and cotton-spun/mixed-spun underwear |
| Level 4 | Mixture of level 3 laundry and level 5 laundry | Clothes made of thick materials, coarse materials, and hard materials (e.g. autumn jumpers, winter jumpers, and work clothes) |
| Level 5 | Wear degree: low Washing strength: high | |

The laundry weight/laundry quality recognition module 62 may be equipped with an artificial neural network (ANN) trained in advance based on machine learning. The artificial neural network may be updated by the laundry weight/laundry quality learning module 61.

The laundry weight/laundry quality recognition module 62 may determine laundry weight and laundry quality based on the artificial neural network. In the case in which laundry weight is classified into five steps, as in this embodiment, the laundry weight/laundry quality recognition module 62 may determine the level to which laundry weight belongs, and may also determine the level to which laundry quality belongs, using the present current value sensed by the current sensing unit 75 as input data of the artificial neural network (ANN).

The laundry weight/laundry quality recognition module 62 may include an artificial neural network (ANN) trained to classify laundry weight and laundry quality based on predetermined criteria. For example, the laundry weight/laundry quality recognition module 62 may include a deep neural network (DNN) trained based on deep learning, such as a convolutional neural network (CNN), a recurrent neural network (RNN), and a deep belief network (DBN).

The recurrent neural network (RNN) may have an artificial neural network structure that is frequently used in natural language processing and the like and is effective for processing time-series data which vary over time and that is formed by building up layers at each instance.

The deep belief network (DBN) has a deep learning structure formed by stacking multiple layers of a restricted Boltzmann machine (RBM), which is a deep learning technique. The deep belief network (DBN) may have a predetermined number of layers formed by repeating restricted Boltzmann machine (RBM) learning.

The convolutional neural network (CNN) is a model mimicking a human brain function, built on the assumption that, when a person recognizes an object, the brain extracts basic features of the object and recognizes the object based on the result of complex processing in the brain.

Meanwhile, the artificial neural network may be trained by adjusting connection weights between nodes (if necessary, adjusting bias values as well) so as to produce desired output from given input. The artificial neural network may continuously update the weight values through learning. Methods such as back propagation may be used in training the artificial neural network.

The laundry weight/laundry quality recognition module 62 may determine at least one of laundry weight and laundry quality of laundry introduced into the washing tub 4 from output of an output layer using the present current value as input data and based on weights between nodes included in the deep neural network (DNN).

Figure 7:
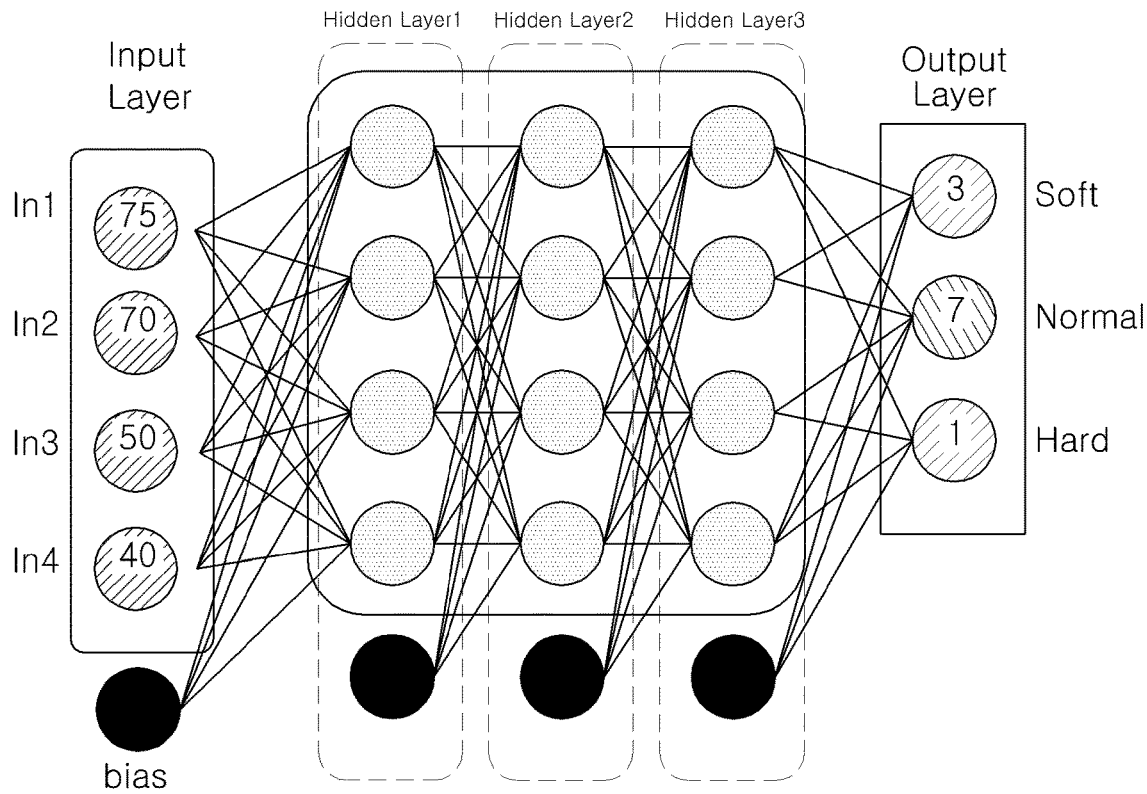
FIG. 7 is a brief view showing an example of the artificial neural network.
Figure 8:
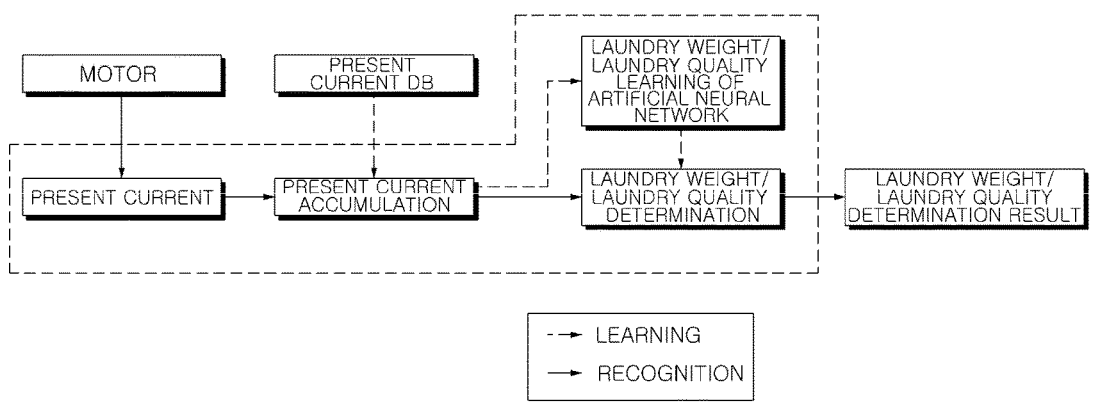
FIG. 8 is a brief view showing a process of determining laundry quality by laundry weight using the present current value of the motor in the state of being divided into a learning process and a recognition process.

FIG. 7 is a brief view showing an example of the artificial neural network. FIG. 8 is a brief view showing a process of determining laundry quality by laundry weight using the present current value of the motor in the state of being divided into a learning process and a recognition process. Hereinafter, a description will be given with reference to FIGS. 7 and 8. Deep learning, which is a subfield of machine learning, enables data-based learning through multiple layers.

Deep learning may exhibit a collection of machine learning algorithms that extract core data from a plurality of data through a sequence of hidden layers.

The deep learning structure may include an artificial neural network (ANN). For example, the deep learning structure may include a deep neural network (DNN), such as a convolutional neural network (CNN), a recurrent neural network (RNN), and a deep belief network (DBN).

Referring to FIG. 7, the artificial neural network (ANN) may include an input layer, hidden layers, and an output layer. The deep neural network (DNN) includes a plurality of hidden layers. Each layer includes a plurality of nodes, and each layer is related to the next layer. The nodes may be connected to each other while having weights.

Output from an arbitrary node belonging to a first hidden layer (hidden Layer 1) becomes input to at least one node belonging to a second hidden layer (hidden Layer 2). At this time, input to each node may be a value obtained by applying a weight to output from a node of the previous layer. A weight may mean connection strength between nodes. The deep learning process may be a process of discovering an appropriate weight.

A well-known facial recognition process will be described for better understanding of deep learning. A computer may distinguish between bright pixels and dark pixels depending on the brightness of pixels, may distinguish between simple forms, such as contours and edges, and may distinguish between complicated forms and objects from an input image. Finally, the computer may grasp a form prescribing the face of a human. Materialization of such a feature (prescription of the facial form of the human) is finally obtained from the output layer through a plurality of hidden layers.

The memory 76 may store input data for sensing laundry weight and data necessary to train the deep neural network (DNN). The memory 76 may store motor speed data acquired by the sensing unit and/or speed data in the state of being added or processed by predetermined period. In addition, the memory 76 may store weights and biases constituting a deep neural network (DNN) structure.

Alternatively, in some embodiments, the weights and biases constituting the deep neural network structure may be stored in a memory embedded in the laundry weight/laundry quality recognition module 62.

Meanwhile, the laundry weight/laundry quality learning module 61 may perform learning using the present current value sensed by the current sensing unit 75 as training data. That is, whenever recognizing or determining laundry weight and/or laundry quality, the laundry weight/laundry quality learning module 61 may add the result of determination to the database in order to update the deep neural network (DNN) structure, such as weights or biases. Alternatively, after training data are secured a predetermined number of times, the learning process may be performed using the secured training data in order to update the deep neural network (DNN) structure, such as weights.

The laundry treatment apparatus may transmit data about the present current acquired by the current sensing unit 75 to a server (not shown) connected to a communication network through the communication unit 73, and may receive data related to machine learning from the server. In this case, the laundry treatment apparatus may update the artificial neural network based on the data related to machine learning received from the server.

Figure 9A:
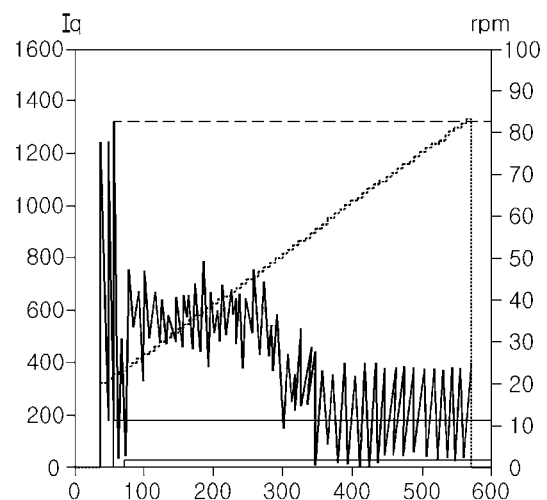
FIG. 9A is a graph showing the present current value sensed by the current sensing unit and FIG. 9B is a graph showing average values obtained by processing a moving average filter.
Figure 9B:
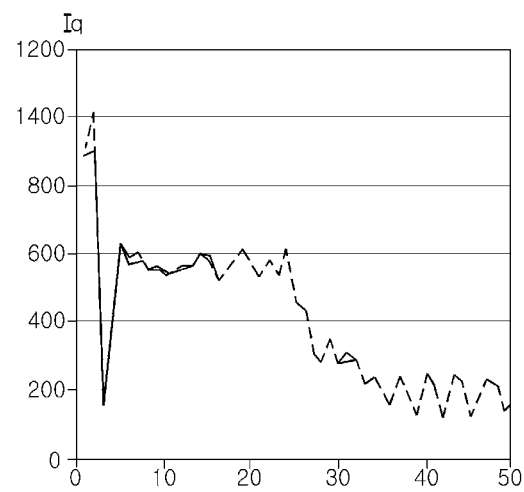
Figure 10:
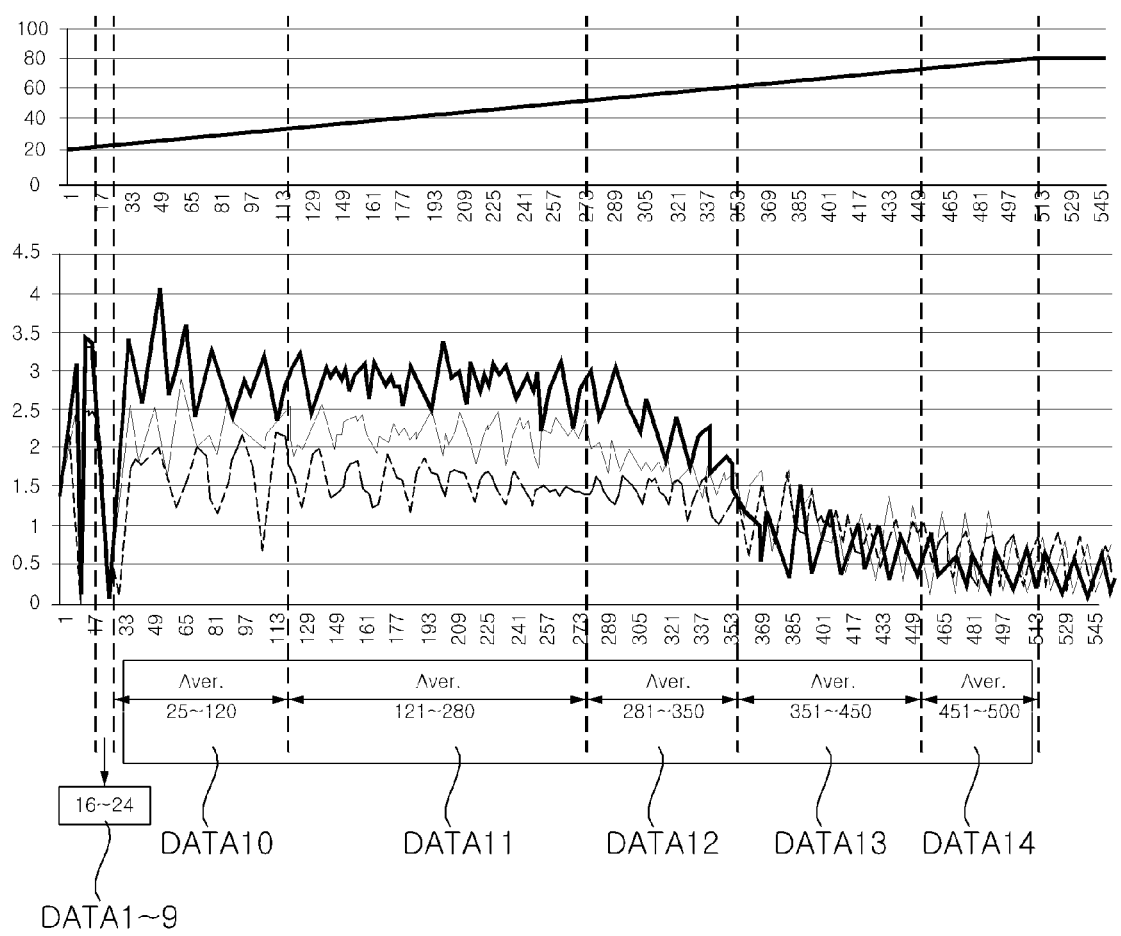
FIG. 10 is a graph showing current values sensed by the current sensing unit.
Figure 11:
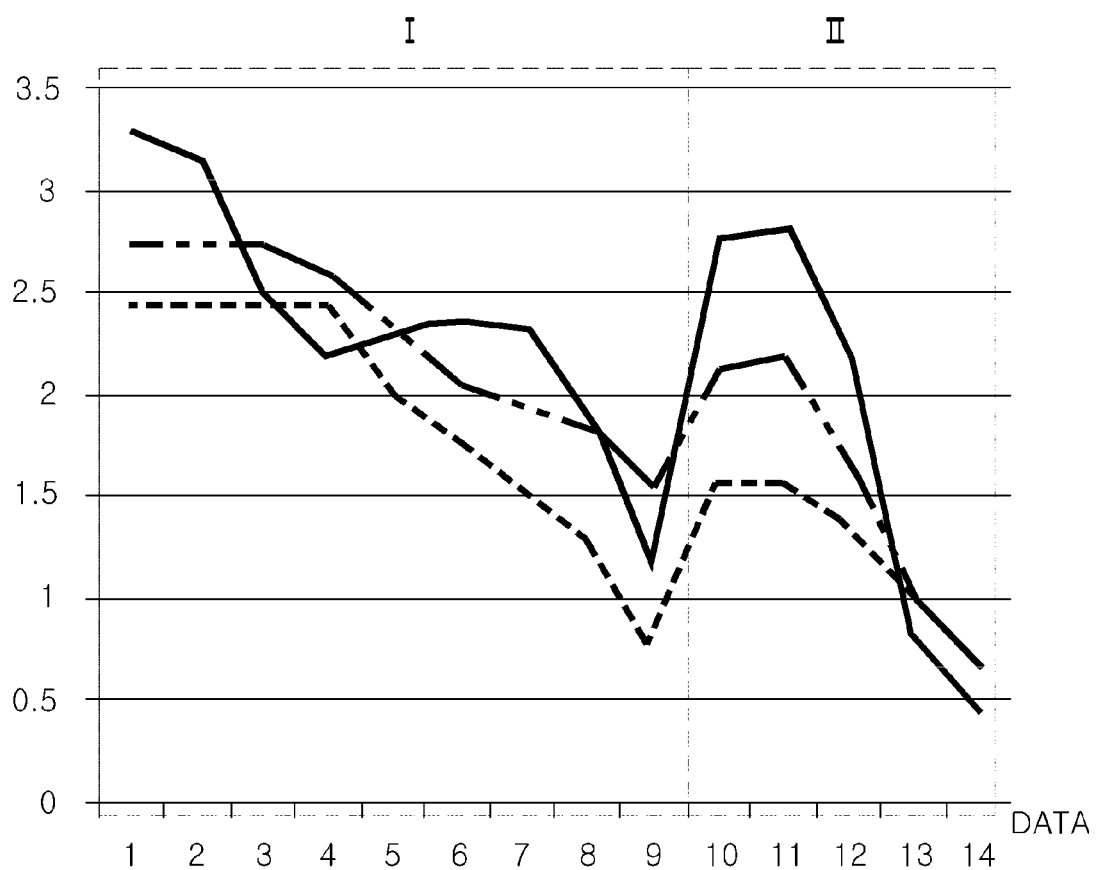
FIG. 11 is a graph showing values obtained by processing the current values of the graph shown in FIGS. 9A and 9B so as to be used as input data of the artificial neural network.
Figure 12:
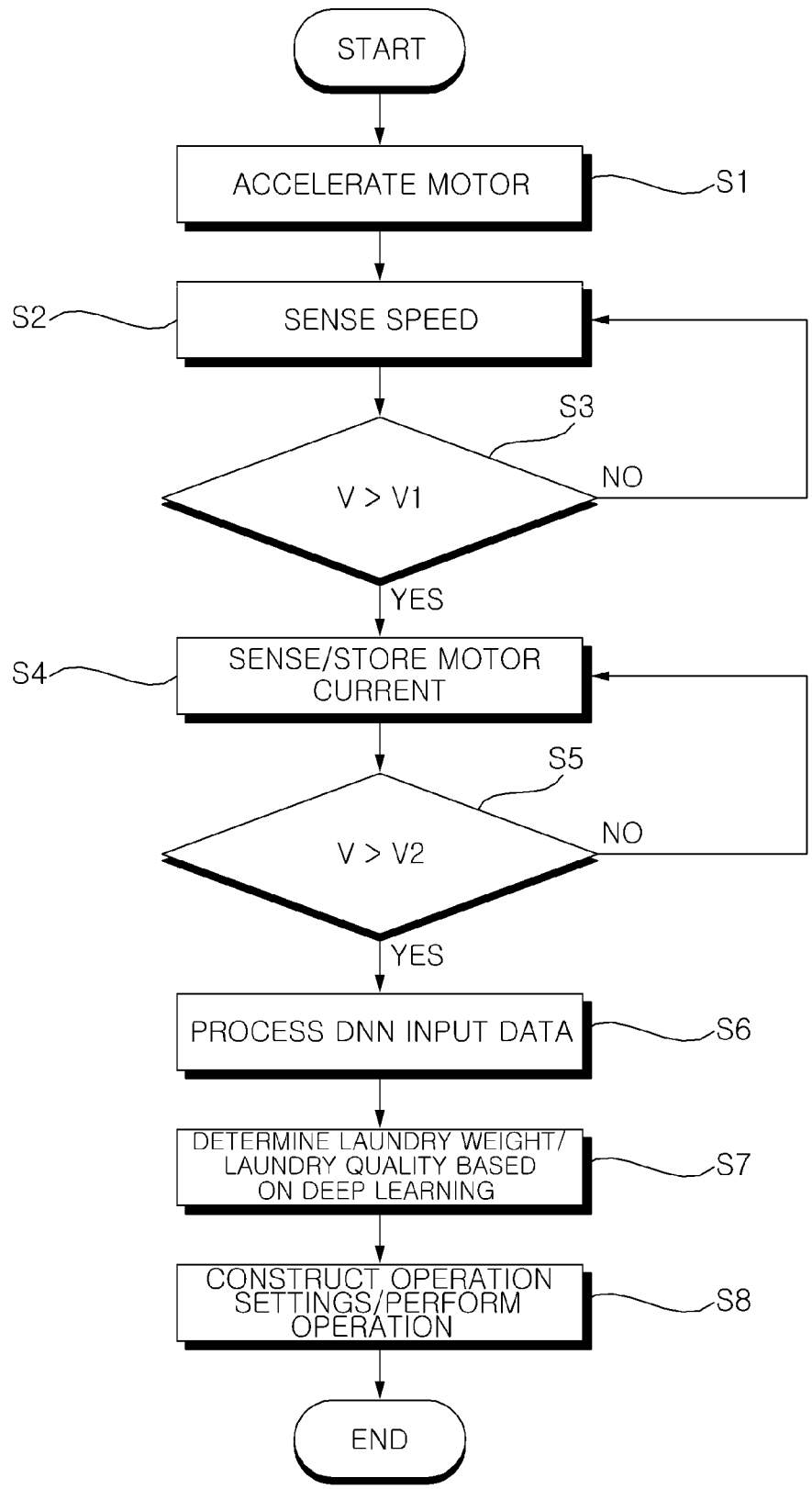
FIG. 12 is a flowchart showing a method of controlling a laundry treatment apparatus according to a first embodiment of the present invention.

FIG. 9A is a graph showing the present current value sensed by the current sensing unit and FIG. 9B is a graph showing average values obtained by processing a moving average filter. FIG. 10 is a graph showing current values sensed by the current sensing unit. FIG. 11 is a graph showing values obtained by processing the current values of the graph shown in FIGS. 9A and 9B so as to be used as input data of the artificial neural network. FIG. 12 is a flowchart showing a method of controlling a laundry treatment apparatus according to a first embodiment of the present invention. Hereinafter, the method of controlling the laundry treatment apparatus according to the first embodiment of the present invention will be described with reference to FIGS. 9A to 12.

The controller 60 performs control such that the motor 9 is rotated at a predetermined target speed (S1, S2, S4, and S5). During rotation of the motor 9, the rotational speed of the washing tub 4 (or the motor 9) is sensed by the speed sensing unit 74 (S2).

The target speed may be set as a rotational speed of the washing tub 4 at which the state in which laundry clings to the drum 42 can be maintained when the washing tub 4 is continuously rotated one or more revolutions in one direction while maintaining the target speed. The target speed may be 60 to 80 rpm, preferably, 80 rpm. Preferably, in the state before the rotational speed of the washing tub 4 reaches the target speed, the laundry moves in the drum 42 (i.e. the laundry is raised to a predetermined height and then dropped by rotation of the drum 42).

Meanwhile, the target speed may be set based on the state in which water is supplied into the water storage tub 3 and thus a portion of the washing tub 4 is immersed in the water. That is, the laundry may move when the washing tub 4 is rotated at the target speed in the state in which a portion of the washing tub 4 is immersed in the water. In other words, during rotation of the washing tub 4, the laundry does not constantly cling to the drum 42 but may be raised to a predetermined height and then dropped.

The present current values used to determine laundry weight and laundry quality include values adopted in a period in which the laundry moves during rotation of the washing tub 4. That is, the controller 60 may adopt the present current values that are necessary based on the rotational speed of the washing tub 4 (or the rotational speed of the motor 9) sensed by the speed sensing unit 74.

Specifically, the controller 60 commands the motor driving unit 71 to accelerate the motor 9, and, when the rotational speed sensed by the speed sensing unit 74 reaches a predetermined first rotational speed V1, may store the present current value from that time in the memory 76 (S3 and S4).

When the washing tub 4 is in a stopped state, force applied to the laundry includes gravity and normal force generated by the inner surface of the drum 42, and these two forces are in equilibrium. When the washing tub 4 is rotated, the force of the lifters 20 in the rotational direction of the washing tub 4 is applied to the laundry.

Meanwhile, in the case in which laundry weight is large, the force of the lifters 20 may not be directly applied to some of the laundry. In the case in which the rotational speed of the washing tub 4 is equal to or less than a predetermined speed, some of the laundry may not move although the washing tub 4 is rotated. Alternatively, even in the case in which the washing tubs 4, in which laundry having the same weight and made of the same material is received, are rotated at the same speed, the laundry may move differently due to various factors, such as the position of the laundry in the washing tub 4.

That is, in the initial stage of an acceleration period of the motor 9, various factors, such as the position of the laundry in the washing tub 4, may be excessively reflected in the current value applied to the motor 9, in addition to laundry weight and laundry quality. The first rotational speed V1 may mean the predetermined speed.

Preferably, therefore, the initial current value in the acceleration period is excluded as input data for determining laundry weight and laundry quality. The current value until the rotational speed V of the motor 9 reaches the first rotational speed V1 may not be used as input data, and the current value sensed after the rotational speed V of the motor 9 reaches the first rotational speed V1 may be used as input data.

The first rotational speed V1 may be lower than a second rotational speed V2, and may be a rotational speed at which the laundry moves in the washing tub 4. The first rotational speed V1 may be 10 to 20 rpm. In the case in which the washing tub 4 is rotated at a speed lower than 10 rpm, the laundry may not move in the washing tub 4. The laundry in the washing tub 4 starts to move when the rotational speed of the washing tub 4 is about 10 rpm, and moves in the washing tub 4 irrespective of laundry weight when the rotational speed V of the washing tub 4 reaches 20 rpm. In this embodiment, the first rotational speed is set to 20 rpm.

When the rotational speed V of the washing tub 4 reaches the predetermined second rotational speed V2, the controller 60 may not store the present current value any longer, and may process the present current value (S5 and S6). Here, the second rotational speed V2 is the target speed.

Meanwhile, the acceleration gradient from the first rotational speed V1 to the second rotational speed V2 may be uniform. Preferably, the acceleration gradient is maintained uniform in order to improve reliability in sensing a change in the pattern of current.

The acceleration gradient must not be too high such that a change in the movement of laundry in the washing tub 4 is clearly exhibited. The acceleration gradient is preferably 1.5 to 2.5 rpm/s, more preferably 2.0 rpm/s. However, the present invention is not limited thereto. The acceleration gradient may have a smallest possible value within a range controllable by the controller 60.

Figure 6:
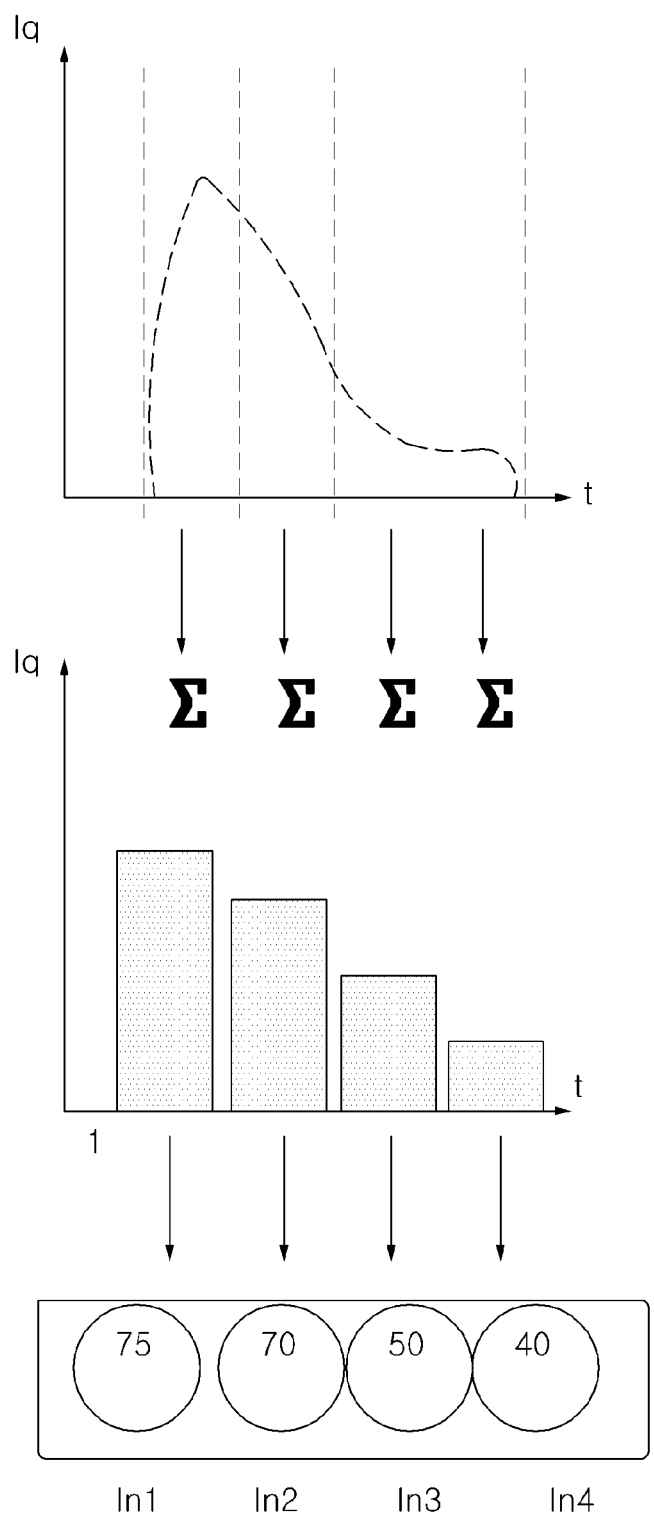
FIG. 6 is a view showing a process of processing present current values obtained by a current sensing unit as input data of an artificial neural network.

As shown in FIG. 6, processing of the present current value is a process of processing the present current values Iq obtained at predetermined points of time according to a predetermined algorithm in order to generate input data In1, In2, In3, In4 . . . of the input layer of the artificial neural network (S6).

This process may include a step of obtaining the average of the present current values Iq and a step of processing the obtained average values according to a predetermined parsing rule in order to generate input data of the artificial neural network. In particular, the number of input data processed according to the parsing rule is less than the number of average values.

Referring to FIG. 8, the controller 60 may acquire current values at predetermined time intervals through the current sensing unit 75. In this embodiment, a total of 545 present current values are obtained at predetermined time intervals in a period in which the rotational speed of the washing tub 4 is accelerated from the first rotational speed V1 to the second rotational speed V2.

The controller 60 may average the present current values thus obtained in every predetermined time period. At this time, the controller 60 may use a moving average filter. Moving average is obtaining an average while changing a period such that a change can be seen. For example, on the assumption that the present current values are $Iq_1$, $Iq_2$, $Iq_3$ . . . $Iq_n$ in a time-series sequence, $Iq_1$ to $Iq_l$ ($1<n$) are averaged to obtain M1, and $Iq_m$ ($m>1$) to $Iq_{m+s-1}$ (s being the number of Iq used to obtain each moving average) are averaged to obtain M2. In this way, moving averages may be obtained while continuously changing a period.

In the case in which time periods in which the moving average is obtained are appropriately set, the number of moving average values M1, M2 . . . may be less than the number of total present current values Iq. As the length of a time period (window) is increased, however, the resolution of a change in the present current is lowered. Therefore, it is necessary to appropriately select the length of the time period. In this embodiment, the controller 60 obtains 50 moving averages from 545 present current values Iq using the moving average filter.

The controller 60 may process the present current values and the moving averages according to the predetermined parsing rule in order to generate input data In1, In2, In3, In4 . . . . The parsing rule may be configured to select a period in which final input data are obtained such that features (laundry weight/laundry quality) to be obtained are well exhibited.

In this embodiment, a total of 14 input data are generated, and the input data include 9 present current values DATA1 to DATA9 obtained at the initial stage of acceleration of the motor 9 ($16^{th}$ to $24^{th}$ present current values) and five average values DATA10 to DATA14 in subsequent periods divided according to a predetermined condition. In particular, the five average values are obtained based on the previously obtained moving averages, whereby it is possible to process the operation more rapidly than adding the present current values in respective periods. Meanwhile, input data In1, In2, In3, In4 . . . In14 thus obtained become the input values of respective nodes of the input layer.

Weights and biases assigned to nodes constituting the artificial neural network are set through machine learning. Such machine learning is repeated based on a current pattern or present current values. In addition, since the characteristics about laundry weight and/or laundry quality are reflected in the current pattern (or the present current value) as described above, machine learning may be performed on data that are previously stored or added by operation of the laundry treatment apparatus until an accurate result (i.e. accurate laundry weight and laundry quality of laundry introduced into the washing tub 4) is derived, whereby it is possible to set improved or accurate weights and biases.

In the artificial intelligence network constructed as described above, laundry weight-laundry quality information may be reflected in the output of the output layer, and the controller 60 may determine laundry weight and/or laundry quality based on a node that outputs the largest value, among the nodes of the output layer.

The controller 60 may input the input data generated at step S6 into the artificial neural network in order to obtain laundry weight and/or laundry quality from the output of the output layer (S7). Subsequently, the controller 60 may construct operation settings based on the laundry weight and/or laundry quality obtained at step S7, and may control the operation (running) of the laundry treatment apparatus according to the settings (S8). The washing algorithm may include a water supply level, washing time, rising time, spin-drying time, and drying time, and a motor driving pattern in each cycle (e.g. a rotational speed, rotation time, acceleration, and braking).

Figure 13:
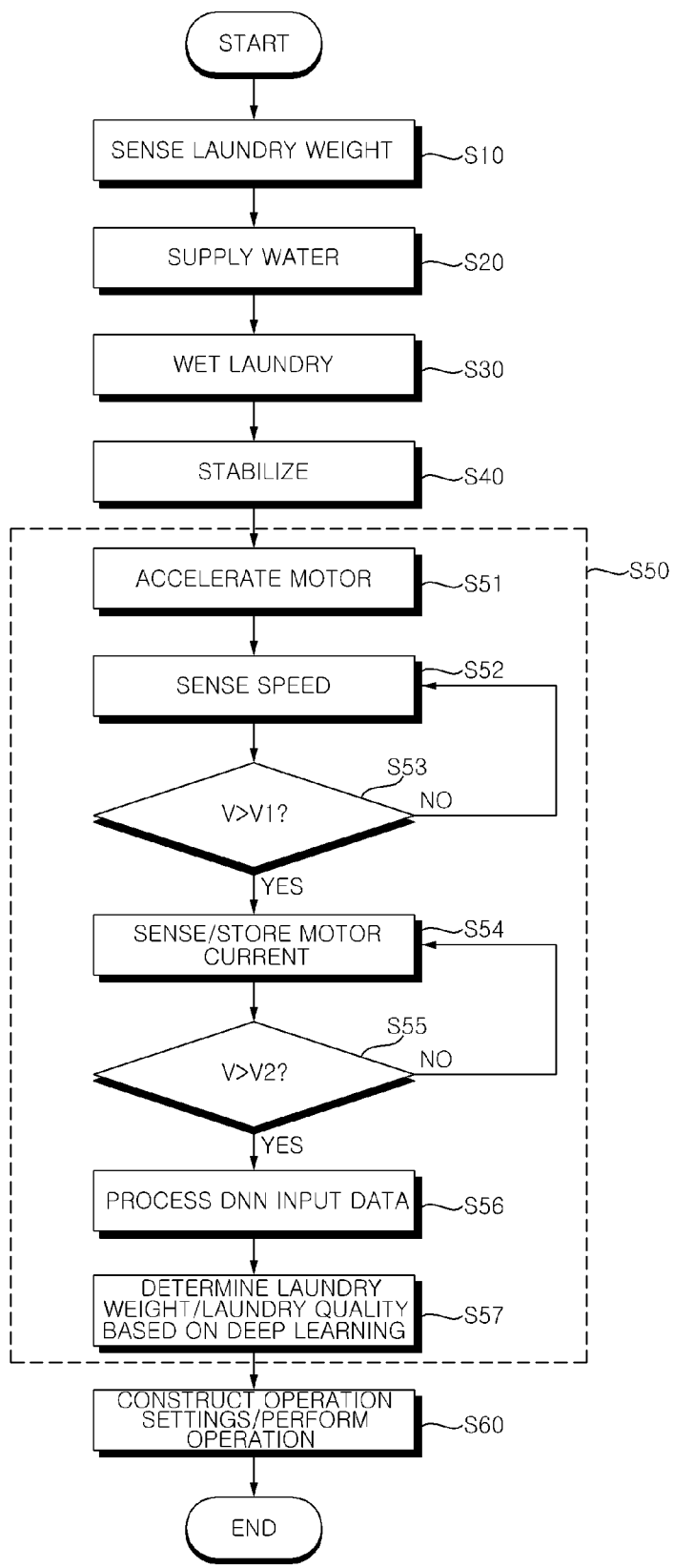
FIG. 13 is a flowchart showing a method of controlling a laundry treatment apparatus according to a second embodiment of the present invention.
Figure 14:
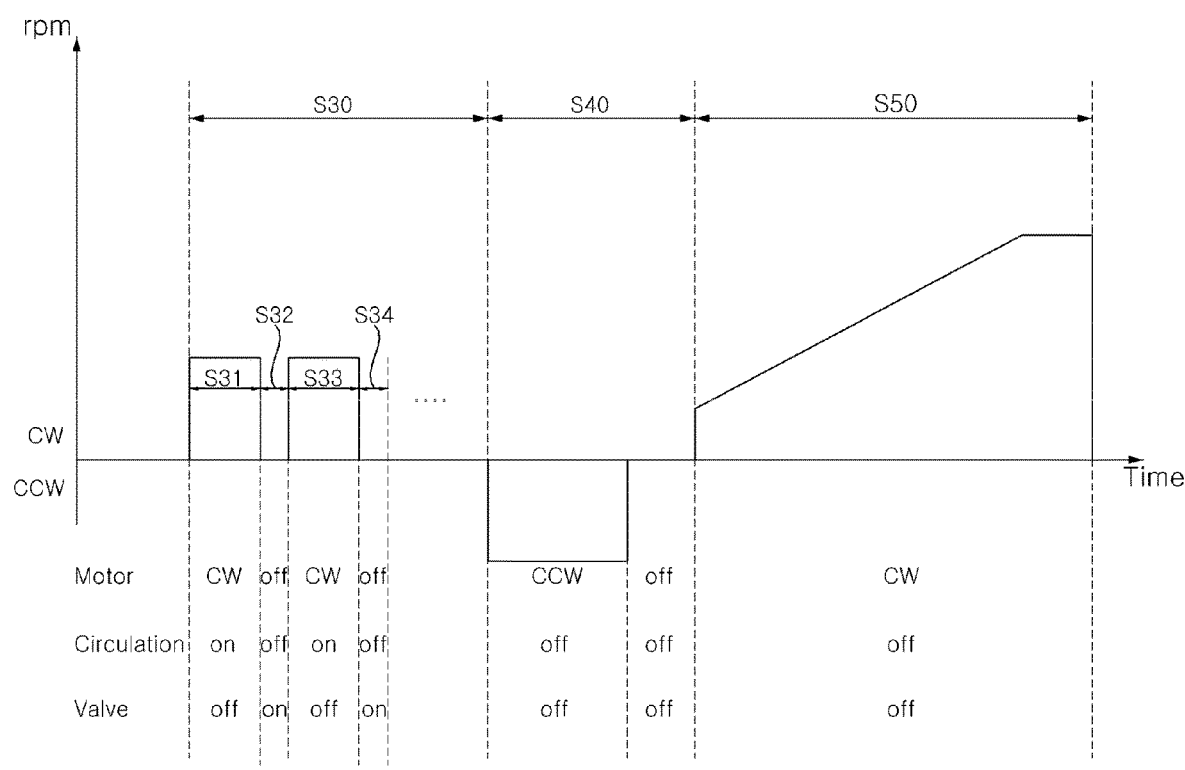
FIG. 14 is a graph showing control of the motor over time at steps S30 to S50 shown in FIG. 13.
Figure 15A:
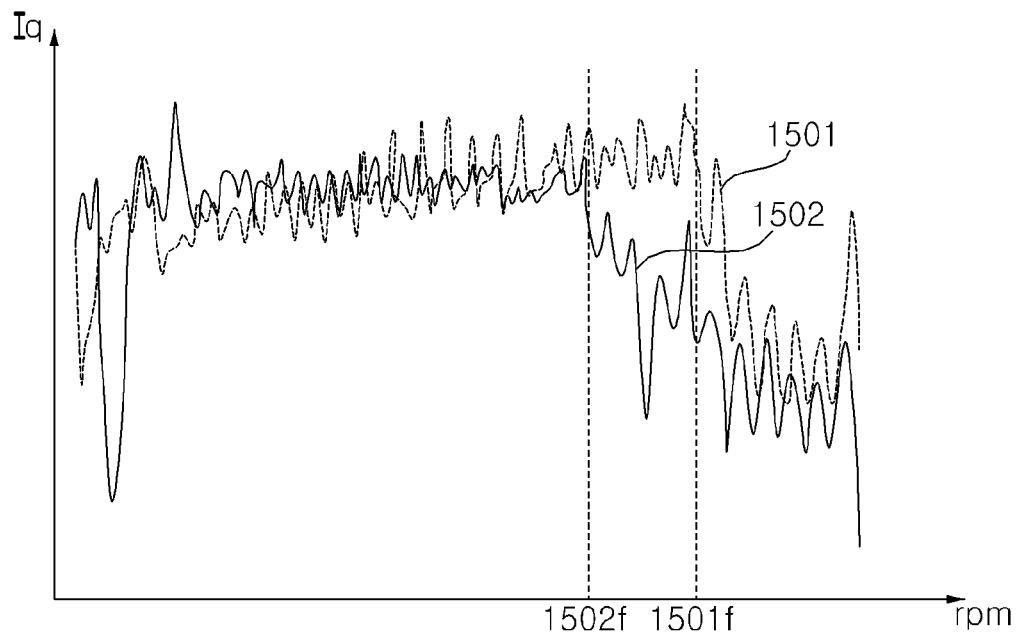
FIGS. 15A and 15B are graphs showing a difference in the pattern of current supplied to the motor depending on whether detergent is activated.
Figure 15B:
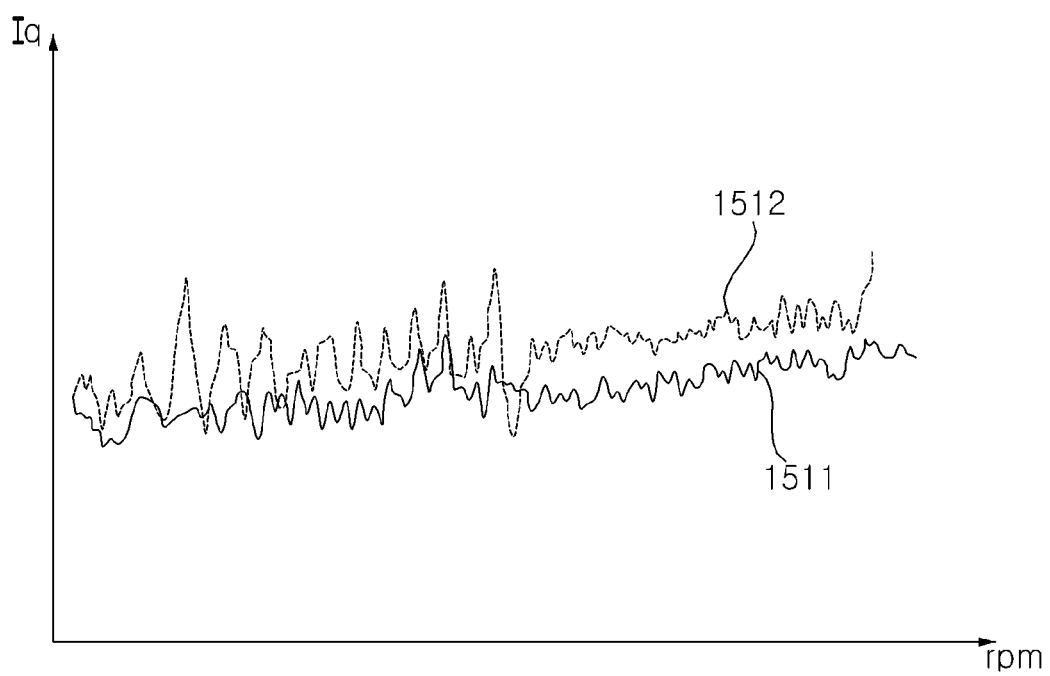

FIG. 13 is a flowchart showing a method of controlling a laundry treatment apparatus according to a second embodiment of the present invention. FIG. 14 is a graph showing control of the motor over time at steps S30 to S50 shown in FIG. 13. FIGS. 15A and 15B are graphs showing a difference in the pattern of current supplied to the motor depending on whether detergent is activated.

Hereinafter, the laundry treatment apparatus according to the second embodiment of the present invention will be described with reference to FIGS. 13 to 15B.

The method of controlling the laundry treatment apparatus according to the second embodiment of the present invention further includes a laundry weight sensing step (S10), a water supply step (S20), a laundry wetting step (S30), and a stabilization step (S40) before a step of obtaining laundry weight/laundry quality (S50), compared to the method of controlling the laundry treatment apparatus according to the first embodiment of the present invention.

The controller 60 rotates the motor 9 in order to sense the weight of laundry received in the washing tub 4 (S10; the laundry weight sensing step). The controller 60 may obtain the weight of laundry using a conventional method of sensing the weight of dry laundry, such as a method of sensing laundry weight from counter electromotive force generated as the result of interrupting the supply of current to the motor 9 after rotation of the motor 9 in order to stop the motor 90.

After obtaining the weight of laundry, the controller 60 controls the water supply valve 5 in order to supply wash water into the washing tub 4 (S20; the water supply step). The amount of wash water that is supplied into the washing tub may be set based on the weight of laundry obtained at the laundry weight sensing step (S10). That is, as the weight of laundry is increased, a larger amount of wash water may be supplied.

In the case in which water is supplied before the step of obtaining laundry weight/laundry quality using the artificial neural network (S50), when laundry having the same composition is introduced, a consistent current pattern may be derived, whereby it is possible to more accurately determine the state of laundry.

After the water supply step (S20), the laundry wetting step (S30), at which the laundry is uniformly wetted, is performed. The laundry wetting step (S30) is performed in order to improve accuracy in determining laundry weight/laundry quality using the artificial neural network. In the initial stage of supplying wash water into the washing tub 4, some of the laundry received in the washing tub 4 may excessively contain water, and some of the laundry may not be wetted. The current value Iq supplied to the motor 9 while accelerating the washing tub 4 in this state may be sensed as different values depending on measurement time even under conditions of the same laundry weight/laundry quality.

In this embodiment, therefore, the laundry wetting step (S30) may be further included before the laundry weight/laundry quality obtaining step (S50). At the laundry wetting step (S30), the washing tub 4 may be on standby for a predetermined time in the state in which wash water is supplied into the washing tub 4, or the washing tub 4 may be rotated in order to uniformly wet the laundry.

Referring to FIG. 14, in this embodiment, at the laundry wetting step (S30), the controller 60 may rotate the washing tub 4 in order to uniformly wet the laundry within a short time.

When the washing tub 4 is rotated in one direction, a motion in which the laundry continuously rolls between a position at which the laundry is located below approximately 90 degrees in the rotational direction of the washing tub 4 and the lowest point of the drum 42 (hereinafter referred to as a "rolling motion") occurs. When the rotational speed of the washing tub 4 is increased, a motion in which the laundry is dropped to the lowest point of the drum 42 from a position at which the laundry is located between approximately 90 degrees and 110 degrees in the rotational direction of the washing tub 4, is raised again by the lifters 20, and is then dropped (hereinafter referred to as a "tumbling motion") occurs. When the washing tub 4 is rotated at a speed higher than the rotational speed at which the tumbling motion occurs, a motion in which the laundry is rotated integrally with the drum 42 in the state of clinging to the inner surface of the drum 42 without being dropped from the highest point of the drum 42 (hereinafter referred to as a "filtration motion") occurs.

The tumbling motion is a motion in which the laundry is raised and dropped according to the rotation of the drum 42 such that a large number of laundry articles are mingled. At the laundry wetting step (S30), therefore, the washing tub 4 may be rotated at the rotational speed at which the tumbling motion occurs in order to uniformly wet the laundry.

Furthermore, the laundry treatment apparatus according to the embodiment of the present invention may include a pump 11 for pumping the water stored in the water storage tub 3 such that the water is circulated and a nozzle (not shown) configured to spray the water pumped by the pump 11 into the washing tub 4. The pump 11 may be connected to the discharge pipe 12 in order to function as a drainage pump, or may be connected to the nozzle via a circulation pipe in order to function as a circulation pump.

The controller 60 may control the pump 11 such that the water discharged from the water storage tub 3 is sprayed into the washing tub 4 through the nozzle in tumbling motion periods (S31 and S33) of the laundry wetting step (S30). In the case in which wash water is circulated through the pump 11 and the nozzle, it is possible to more rapidly wet the laundry.

Meanwhile, the laundry wetting step (S30) may include steps of rotating the washing tub 4 (S31 and S33) and steps of resupplying wash water into the washing tub 4 (S32 and S34). At the steps of rotating the washing tub 4 (S31 and S33), the controller 60 may rotate the washing tub 4 at the rotation speed at which the tumbling motion occurs.

At the water supply step (S20), the amount of water that is supplied may be set based on the weight of laundry, and the amount of wash water that is supplied may be sensed using a water level sensor (not shown). When the washing tub is rotated (S31 and S33) at the laundry wetting step (S30), laundry that has not sufficiently absorbed water may further absorb water, and the level of the wash water may be reduced.

The level of the wash water may affect the current value supplied to the motor 9 at the step of obtaining laundry weight/laundry quality. For more accurate determination of laundry quality, it is necessary to supply wash water depending on the weight of laundry obtained at the laundry weight sensing step such that the level of the wash water is uniform. Consequently, the laundry wetting step (S30) may include a step of resupplying an amount of wash water corresponding to the reduced level of wash water into the washing tub 4 while rotating the washing tub 4 (S32 and S34).

At the wash water resupply step (S32 and 34), the controller 60 may stop the rotation of the washing tub 4, and may stop the operation of the pump 11 such that spraying of wash water through the nozzle is stopped in order to supply wash water having a level set depending on the weight of laundry.

At the laundry wetting step (S30), the washing tub rotation steps (S31 and S33) and the wash water resupply steps (S32 and 34) may be alternately repeated a plurality of times. The number of repetitions may be set based on the weight of laundry. As the weight of laundry is increased, the number of repetitions may also be increased. For example, referring to Table 1, in the case in which the weight of laundry is level 1 or 2, the washing tub rotation step (S31) and the wash water resupply step (S32) may be performed once. In the case in which the weight of laundry is level 3 or 4, the washing tub rotation step (S31) and the wash water resupply step (S32) may be alternately performed four times.

After the laundry wetting step (S30), the stabilization step (S40) is performed. The stabilization step (S40) is performed in order to improve accuracy in determining laundry weight/laundry quality using the artificial neural network in the same manner as the water supply step and the laundry wetting step (S30).

Laundry may have different water absorption capacities (hereinafter referred to as "water content") depending on the material thereof. The water content may affect the current value supplied to the motor 9. Therefore, the laundry weight/laundry quality obtaining step (S50) must be performed in the state in which the laundry absorbs water equivalent to the water content.

Since wash water is sprayed through the nozzle while the washing tub 4 is rotated at the laundry wetting step (S30), however, the laundry received in the washing tub 4 may absorb a larger amount of water than the water content immediately after the laundry wetting step (S30) is finished.

For easy understanding, the state immediately after a garment wetted in water is taken out of the water is considered. It can be seen that a large amount of water falls from the garment just taken out of the water. The reason for this is that the garment just taken out of the water absorbs a larger amount of water than the water content depending on the material of the garment and thus water exceeding the water content falls from the garment. The current value Iq supplied to the motor 9 while accelerating the washing tub 4 in this state may be sensed as different values depending on measurement time even under conditions of the same laundry weight/laundry quality.

After the lapse of a predetermined time (hereinafter referred to as a "stabilization time"), the laundry may be in the state of absorbing water equivalent to the water content depending on the material thereof (hereinafter referred to as a "stabilization state"). The stabilization step (S40) is a step of waiting for the stabilization time such that laundry absorbs water equivalent to the water content depending on the material thereof.

Meanwhile, for rapid stabilization of the laundry, the controller 60 may rotate the motor. If the rotational speed of the washing tub 4 is too high, the filtration motion may occur and spin drying may be performed due to centrifugal force. If the rotational speed of the washing tub 4 is too low, the stabilization time may be increased. At the stabilization step (S40) of this embodiment, the controller 60 may rotate the washing tub 4 at the rotational speed at which the tumbling motion occurs. The controller 60 may rotate the washing tub for a predetermined stabilization time. In this embodiment, the stabilization time is set to about 10 seconds.

After the stabilization step (S40) is finished, the step of obtaining laundry weight/laundry quality using the artificial neural network (S50) is performed. The controller 60 may construct operation settings based on the obtained laundry weight and/or laundry quality, and may control the operation (running) of the laundry treatment apparatus according to the settings (S60).

The laundry weight/laundry quality obtaining step (S50) of this embodiment is identical to steps S1 to S7 of the first embodiment, and therefore a detailed description thereof will be omitted.

Hereinafter, the time at which the laundry weight/laundry quality obtaining step (S50) is performed will be described with reference to FIGS. 15A and 15B. The laundry weight/laundry quality obtaining step (S50) is performed before a washing cycle (S60) is performed.

In consideration of a conventional laundry weight sensing method, it may be natural to sense laundry quality before the washing cycle (S60) in order to perform washing according to an algorithm constructed based on the laundry quality. Unlike sensing of laundry weight, however, sensing of laundry quality using the artificial neural network requires a period of slowly accelerating the washing tub 4, whereby a predetermined time is necessary before main washing.

When a user operates the laundry treatment apparatus, the user watches the operation of the laundry treatment apparatus at the initial stage of the operation thereof after introducing laundry into the laundry treatment apparatus in many cases. However, a large amount of time is necessary until the operation of the laundry treatment apparatus is finished, and therefore the user does not carefully observe the operation of the laundry treatment apparatus in the middle of washing in many cases. Consequently, a sensing step requiring a long time at the initial stage of the operation of the laundry treatment apparatus before the main washing may provide negative impression to the user.

Particularly, in the case in which a laundry quality sensing step is performed a plurality of times, as described below, a first laundry quality sensing step may be performed before the washing cycle is performed, and the following laundry quality sensing step may be performed in the middle of the washing cycle.

After the washing cycle is performed, however, detergent included in the wash water is mixed with the wash water, whereby bubbles are formed and the detergent is activated. In the case in which the current value supplied to the motor is sensed while the washing tub is accelerated at a uniform acceleration gradient in this state, a value different from the value in the state before the detergent is activated may be sensed, whereby no consistent current value may be sensed even under conditions of the same weight and state of laundry.

FIG. 15A shows the speed at which the laundry is rotated integrally with the washing tub 4 due to centrifugal force as the washing tub 4 is accelerated. In the case in which sensing of laundry quality (S50) is performed before the washing cycle is performed (1501), the rotational speed of the washing tub 4 reaches 1501f, whereby the laundry is rotated integrally with the washing tub in the state of clinging to the drum 42 (the filtration motion). In the case in which sensing of laundry quality is performed at the middle step at which the washing cycle (S60) is performed (1502), detergent is activated and thus bubbles are formed, whereby the viscosity of wash water is changed. Consequently, the filtration motion may occur at a speed 1502f, which is different from the case in which sensing of laundry quality (S50) is performed before the washing cycle is performed (1501).

FIG. 15B shows that different current values are sensed in the case in which sensing of laundry quality (S50) is performed before the washing cycle is performed (1501) and the case in which sensing of laundry quality is performed at the middle step at which the washing cycle (S60) is performed (1502).

In the case in which sensing of laundry quality is performed at the middle step at which the washing cycle (S60) is performed (1502), detergent is activated, whereby the viscosity of wash water is changed. As a result, the current value supplied to the motor in an acceleration period of the laundry weight/laundry quality sensing step using the artificial neural network is different from the value sensed in the case in which sensing of laundry quality (S50) is performed before the washing cycle is performed (1501).

In addition, since the washing tub 4 is rotated while being accelerated in the state in which the wash water is supplied at the laundry weight/laundry quality sensing step using the artificial neural network according to the embodiment of the present invention, it is possible to reduce impatience that the user may feel in the initial stage of washing as the washing is not performed.

Figure 16:
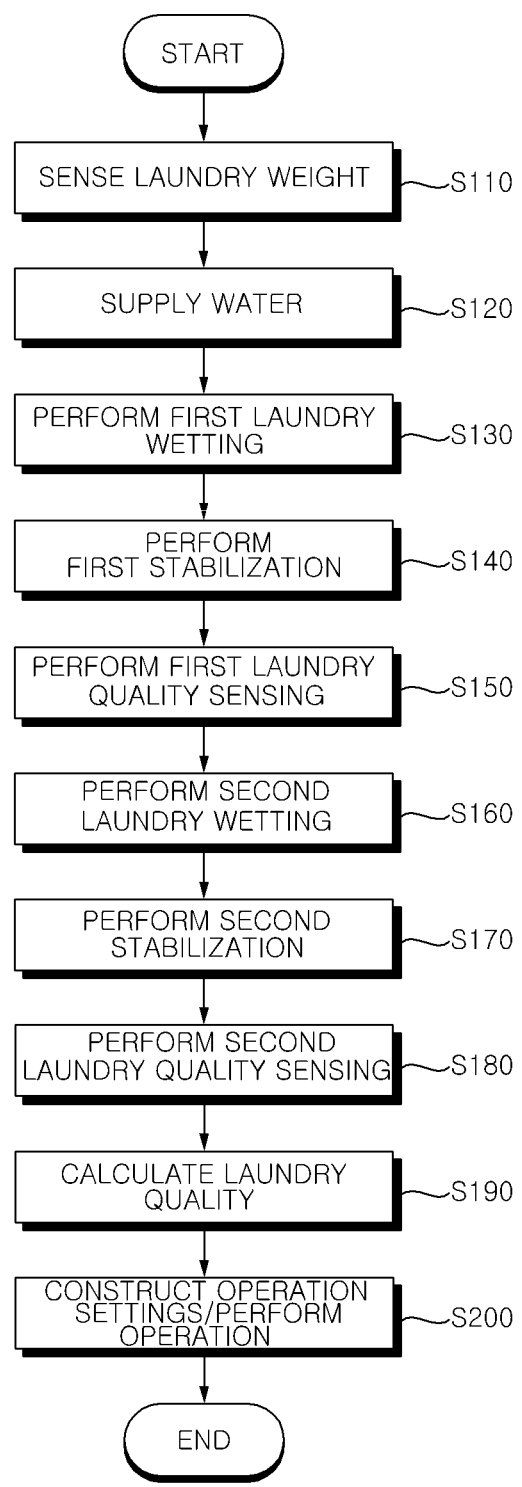
FIG. 16 is a flowchart showing a method of controlling a laundry treatment apparatus according to a third embodiment of the present invention.
Figure 17:
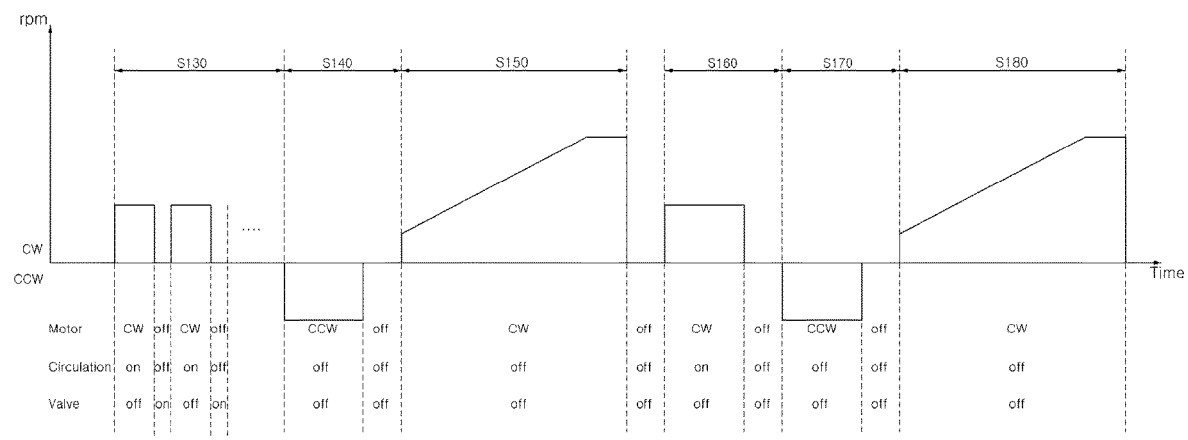
FIG. 17 is a graph showing control of the motor over time at steps s130 to s180 shown in FIG. 16.

FIG. 16 is a flowchart showing a method of controlling a laundry treatment apparatus according to a third embodiment of the present invention. FIG. 17 is a graph showing control of the motor over time at steps S130 to s180 shown in FIG. 16.

Hereinafter, the laundry treatment apparatus according to the third embodiment of the present invention will be described with reference to FIGS. 16 and 17.

The method of controlling the laundry treatment apparatus according to the third embodiment of the present invention is different from the method of controlling the laundry treatment apparatus according to the second embodiment of the present invention in that a step of determining laundry quality using the artificial neural network is performed a plurality of times. In the case in which sensing of laundry quality is performed a plurality of times, it is possible to improve accuracy in determining laundry weight/laundry quality.

A laundry weight sensing step (S110), a water supply step (S120), a first laundry wetting step (S130), and a first stabilization step (S140), and a first laundry quality sensing step (S150) of this embodiment are identical to the laundry weight sensing step (S10), the water supply step (S20), the laundry wetting step (S30), the stabilization step (S40), and the laundry weight/laundry quality obtaining step (S50) of the second embodiment, and therefore a detailed description thereof will be omitted.

A second laundry quality sensing step may be performed before a washing cycle (S200) is performed, as previously described with reference to FIGS. 15A and 15B.

At a second laundry wetting step (S160), the controller 60 closes the water supply valve 5 such that no further wash water is supplied into the washing tub 4. That is, the second laundry wetting step (S160) does not include a water resupply step, unlike the first laundry wetting step (S130) and the laundry wetting step (S30) of the second embodiment.

As previously described, the level of wash water may be set based on laundry weight, and no wash water is resupplied since the weight of laundry received in the washing tub at the first laundry quality sensing step and the weight of laundry received in the washing tub at the second laundry quality sensing step are the same.

A second stabilization step (S170) is similar to the first stabilization step (S140), and a second laundry quality sensing step (S180) is similar to the first laundry quality sensing step (S150), and therefore a detailed description thereof will be omitted.

Meanwhile, in order for the second laundry quality sensing step to have the same conditions as the first laundry quality sensing step, the washing tub may be rotated in the same direction (e.g. in the clockwise direction) at the first laundry wetting step (S130) and the second laundry wetting step (S160), the washing tub may be rotated in the same direction (e.g. in the counterclockwise direction) at the first stabilization step (S140) and the second stabilization step (S170), and the washing tub may be rotated in the same direction (e.g. in the clockwise direction) at the first laundry quality sensing step (S150) and the second laundry quality sensing step (S180).

In addition, at the stabilization steps (S140 and S170), the washing tub 4 may be rotated in a direction opposite the direction in which the washing tub is rotated at the laundry wetting steps (S130 and S160) in order to reduce the stabilization time.

The method of controlling the laundry treatment apparatus according to the third embodiment of the present invention may include a step of obtaining the state of laundry based on the first laundry quality and the second laundry quality sensed respectively at the first laundry quality sensing step and the second laundry quality sensing step (S190) after the second laundry quality sensing step (S180).

Hereinafter, a method of obtaining the state of laundry based on the first laundry quality and the second laundry quality (S190) will be described with reference to Table 2 and Table 4 below.

TABLE 4

| Laundry quality average | 1 | 1.5 | 2 | 2.5 | 3 | 3.5 | 4 | 4.5 | 5 |
|---|---|---|---|---|---|---|---|---|---|
| Final determination | 1 | 1 | 2 | 2 | 3 | 3 | 4 | 5 | 5 |

In the case in which the first laundry quality determined at the first laundry quality sensing step (S150) is level 1 and the second laundry quality determined at the second laundry quality sensing step is level 1, the laundry quality average may be level 1. In the case in which the first laundry quality is level 1 and the second laundry quality is level 2, the laundry quality average may be level 1.5. In this way, the arithmetic mean of the first laundry quality and the second laundry quality may be defined as the laundry quality average.

Referring to Table 4, in the case in which the laundry quality average is level 1.5, i.e. in the case in which the state of the laundry is determined to be level 1 at a sensing step and the state of the laundry is determined to be level 2 at another sensing step, the laundry received in the washing tub 4 is laundry, the wear degree of which is more important than the washing performance thereof. In this case, therefore, the state of the laundry is finally determined to be level 1.

In the same manner, in the case in which the laundry quality average is level 2.5, the state of the laundry is finally determined to be level 2.

Also, in the case in which the laundry quality average is level 3.5, the state of the laundry may be level 2. In the case in which such laundry is washed according to a washing mode set based on the fifth laundry quality step, the laundry may be damaged.

A problem in which washing performance is low may be solved through rewashing, but a problem in which laundry is damaged is not easily solved. In the case in which the laundry quality average is level 3.5, therefore, the state of the laundry is determined to correspond to the third laundry quality step.

Meanwhile, in the case in which the laundry quality average is level 4.5, i.e. in the case in which the state of the laundry is determined to be level 4 at a sensing step and the state of the laundry is determined to be level 5 at another sensing step, the laundry received in the washing tub 4 is laundry, the washing performance of which is more important than the wear degree thereof. In this case, therefore, the state of the laundry is finally determined to correspond to the fifth laundry quality step.

That is, in the case in which the wear degree of the laundry is important, the state of the laundry may be finally determined after the decimal point is omitted, and, in the case in which the washing performance of the laundry is important, the state of the laundry may be finally determined after the decimal point is raised.

Figure 18:
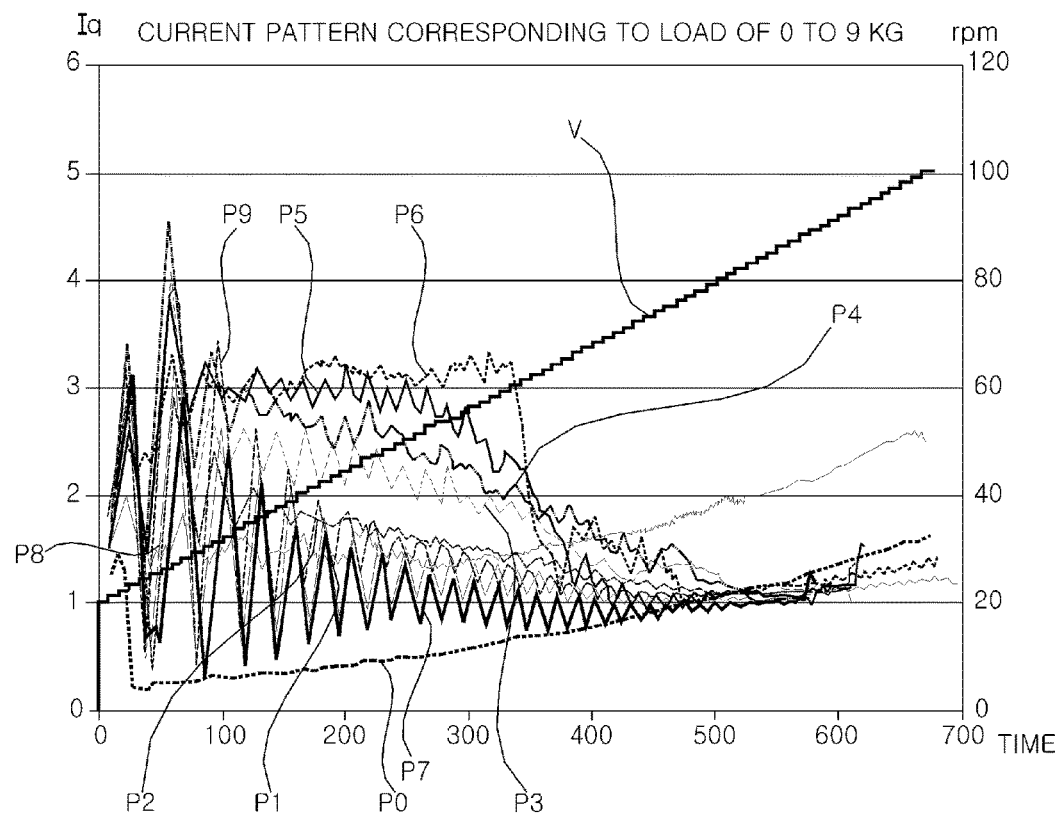
FIG. 18 is a graph showing current patterns by load in the state of overlapping each other.
Figure 19:
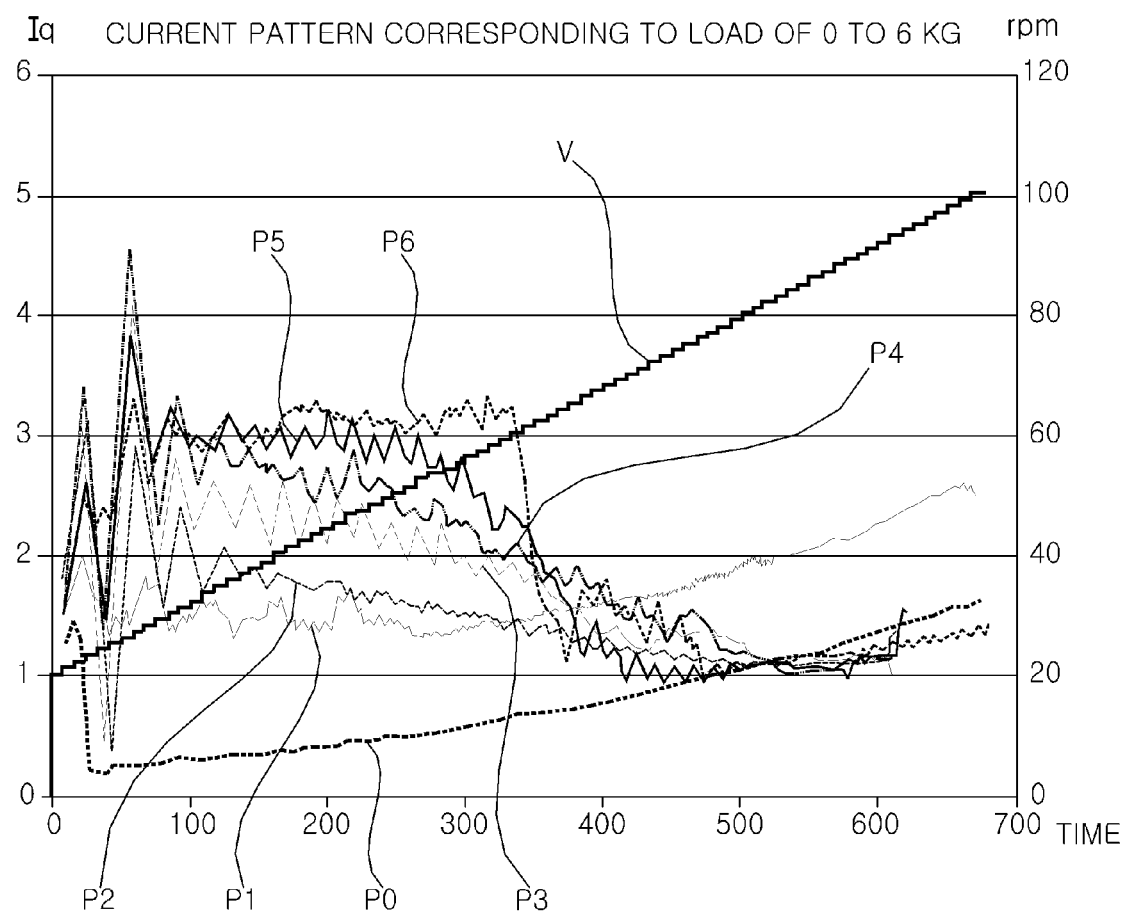
FIG. 19 is a graph showing classification of current patterns corresponding to load of 0 to 6 kg in FIG. 18.
Figure 20:
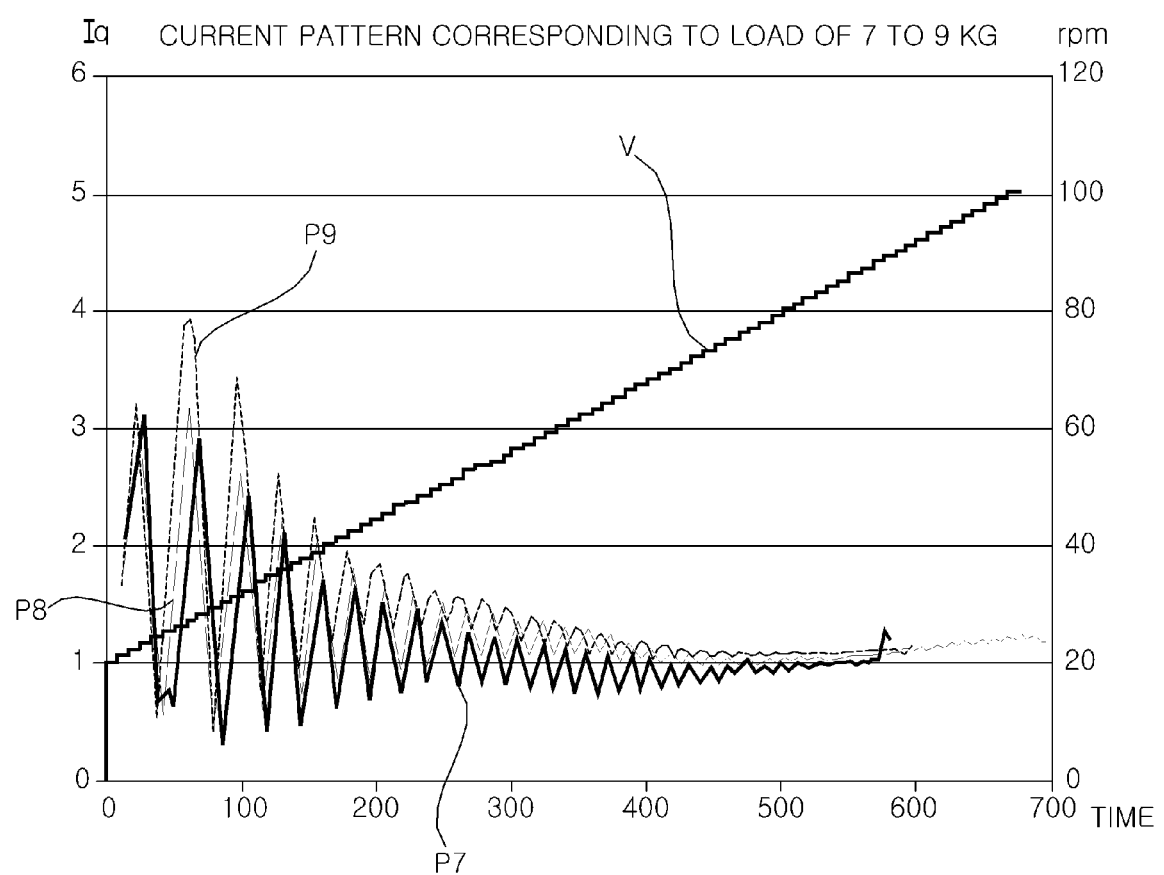
FIG. 20 is a graph showing classification of current patterns corresponding to load of 7 to 9 kg in FIG. 18.

FIG. 18 is a graph showing current patterns by load in the state of overlapping each other. FIG. 19 is a graph showing classification of current patterns corresponding to load of 0 to 6 kg in FIG. 18. FIG. 20 is a graph showing classification of current patterns corresponding to load of 7 to 9 kg in FIG. 18. Hereinafter, a description will be given with reference to FIGS. 18 to 20. P0 to P9 shown in these figures indicate load weight (laundry weight) of 0 to 9 kg.

Laundry may be constrained by the door 2. This phenomenon may occur in the case in which a large weight of laundry is introduced into the washing tub 4, whereby the laundry comes into tight contact with or interferes with the door 2. The constraint of the laundry affects the load applied to the motor 9. In the process of determining laundry weight and/or laundry quality, therefore, it is preferable to exclude the present current value obtained while the washing tub 4 is rotated (or accelerated) in the state in which the laundry is constrained.

Referring to FIGS. 19 and 20, current patterns P0 to P6 when the load weight is 0 to 6 kg and current patterns P7 to P9 when the load weight is 7 to 9 kg are quite different from each other. That is, in the case of a large weight of laundry (in this embodiment, 7 to 9 kg), it can be seen that the present current value is periodically increased and decreased (or fluctuated) at the initial stage of acceleration of the washing tub 4. The reason for this is that, when some of the laundry is constrained by the door 2 and the washing tub 4 interferes with the constrained laundry, the load of the motor 9 is increased and that, when the interference is weakened or removed, the load of the motor 9 is decreased. That is, a change in the load of the motor 9 due to the constraint of the laundry occurs in response to the rotational cycle of the washing tub 4.

Such a load change pattern may be learned through machine learning, and the learning result may be stored in the memory 76 in the form of a database. An artificial neural network may be constructed using the learning result. The controller 60 may determine laundry constraint (or laundry catching) through the output of the output layer based on the artificial neural network thus constructed.

Although the above description has been made by way of example based on a front load type laundry treatment apparatus, in which the washing tub 4 is rotated about a substantially horizontal axis, the laundry treatment apparatus according to the present invention and the method of controlling the same may be applied to a top load type laundry treatment apparatus.

Meanwhile, the method of controlling the laundry treatment apparatus according to the embodiment of the present invention may be implemented as code that can be written on a processor-readable recording medium and thus read by a processor. The processor-readable recording medium may be any type of recording device in which data is stored in a processor-readable manner. The processor-readable recording medium may include, for example, read only memory (ROM), random access memory (RAM), compact disc read only memory (CD-ROM), magnetic tape, a floppy disk, and an optical data storage device, and may be implemented in the form of a carrier wave transmitted over the Internet. In addition, the processor-readable recording medium may be distributed over a plurality of computer systems connected to a network such that processor-readable code is written thereto and executed therefrom in a decentralized manner.

As is apparent from the above description, the laundry treatment apparatus according to the present invention and the method of controlling the same are capable of analyzing the current pattern of a motor using an artificial neural network based on machine learning. In particular, the current pattern is changed depending on the state of laundry in a drum. In particular, various characteristics of the laundry, such as laundry movement, laundry weight, and laundry quality, are reflected in the current pattern. Consequently, it is possible to accurately and rapidly classify the laundry by characteristic using the current pattern as input data of the artificial neural network constructed through training based on machine learning.

In particular, the classification of the laundry by characteristic is possible based on various criteria, such as the material of the laundry, the water content of the laundry, and the volumetric difference between dry laundry and wet laundry, in addition to the laundry weight. In addition, accuracy may be further improved with accumulation of training data (motor current data) of machine learning.

It will be apparent that, although the preferred embodiments have been shown and described above, the present invention is not limited to the above-described specific embodiments, and various modifications and variations can be made by those skilled in the art without departing from the gist of the appended claims. Thus, it is intended that the modifications and variations should not be understood independently of the technical spirit or prospect of the present invention.

What is claimed is:

1. A laundry treatment apparatus comprising:
   a washing tub configured to receive laundry, the washing tub being configured to be rotatable;
   a motor configured to rotate the washing tub;

a controller configured to control the motor such that the washing tub is rotated while being accelerated;
a current sensing unit configured to sense an electrical current value of the motor,
a speed sensing unit configured to sense a rotational speed of the motor, and
a water supply valve configured to supply water into the washing tub,
wherein the controller is configured to obtain a laundry weight and a laundry quality by an output of an output layer of a pre-trained machine-learning network based on an input to an input layer of the machine-learning network that comprises the electrical current value sensed by the current sensing unit,
wherein the electrical current value that is input to the machine-learning network is sensed by the current sensing unit during an accelerated rotation of the washing tub within a range of rotation in which the laundry is separated from an inner surface of the washing tub,
wherein the controller is further configured to:
select, from among a plurality of electrical current values obtained by the electrical current sensing unit and based on the rotational speed of the motor sensed by the speed sensing unit, the electrical current value corresponding to a period in which the rotational speed of the motor is accelerated from a first rotational speed to a second rotational speed; and
use the selected electrical current value as an input to the input layer of the machine-learning network, and
wherein the controller is further configured to:
determine a constraint of the laundry based on an output of the output layer of the pre-trained machine-learning network, and
not obtain the laundry weight and the laundry quality, when it is determined that the constraint of the laundry occurs.

2. The laundry treatment apparatus according to claim 1, wherein based on the washing tub being rotated by one or more revolutions in a first direction within the range of rotation of the washing tub in which the electrical current value that is input to the machine-learning network is sensed by the current sensing unit:
the laundry that is located at a lowermost position in the washing tub is raised to a first height by the rotation of the washing tub and is then dropped while being separated from the inner surface of the washing tub.

3. The laundry treatment apparatus according to claim 1, wherein the second rotational speed is 60 rotations per minute (rpm) to 80 rpm.

4. The laundry treatment apparatus according to claim 1, wherein the controller is further configured to perform control such that the motor is rotated while maintaining the second rotational speed after the rotational speed of the motor reaches the second rotational speed,
wherein based on the washing tub being rotated by one or more revolutions in a first direction by rotation of the motor at the second rotational speed, the laundry in the washing tub is rotated in a state of clinging to the inner surface of the washing tub without being dropped from a highest point of the rotation of the washing tub.

5. The laundry treatment apparatus according to claim 1, wherein the first rotational speed is 10 rpm to 20 rpm.

6. The laundry treatment apparatus according to claim 1, wherein the controller is further configured to:
determine operation settings based on the laundry weight and the laundry quality; and
control operations of the laundry treatment apparatus according to the determined operation settings.

7. The laundry treatment apparatus according to claim 6, wherein the controller is further configured to determine the laundry weight and the laundry quality a plurality of times.

8. The laundry treatment apparatus according to claim 1, wherein the controller is further configured to:
perform control such that water is supplied through the water supply valve, and then the washing tub is accelerated,
supply water to the washing tub through the water supply valve, rotate the washing tub for a predetermined time to wet the laundry uniformly, and perform the accelerating of the washing tub to a predetermined target speed, and
perform, when the washing tub is rotated to wet the laundry, resupplying an amount of wash water, which corresponds to a reduced level of wash water absorbed by laundry, into the washing tub while rotating the washing tub.

* * * * *